(12) United States Patent
Goo et al.

(10) Patent No.: US 10,356,306 B2
(45) Date of Patent: Jul. 16, 2019

(54) ELECTRONIC DEVICE CONNECTED TO CAMERA AND METHOD OF CONTROLLING SAME

(71) Applicant: Samsung Electronics Co., Ltd., Gyeonggi-do (KR)

(72) Inventors: Ja-Min Goo, Gyeonggi-do (KR); Hyung-Woo Kim, Gyeonggi-do (KR); Ji-Hyun Park, Gyeonggi-do (KR); Seung-Hyuk Yu, Seoul (KR); Dong-Kyu Lee, Seoul (KR); Kyung-Hee Lee, Seoul (KR); Ung-Sik Kim, Gyeonggi-do (KR); Seung-Kyoon Shin, Gyeonggi-do (KR); Jin-Hong Jeong, Gyeonggi-do (KR); Ju-Yeong Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/805,845

(22) Filed: Nov. 7, 2017

(65) Prior Publication Data

US 2018/0131858 A1     May 10, 2018

(30) Foreign Application Priority Data

Nov. 7, 2016 (KR) .................. 10-2016-0147741

(51) Int. Cl.
*H04N 5/232* (2006.01)
*G06T 3/40* (2006.01)
*H04L 29/08* (2006.01)
*H04N 1/00* (2006.01)
*H04L 29/12* (2006.01)
*H04L 29/06* (2006.01)
*H04N 7/18* (2006.01)

(52) U.S. Cl.
CPC ....... *H04N 5/23206* (2013.01); *G06T 3/4038* (2013.01); *H04L 67/125* (2013.01); *H04N 1/00* (2013.01); *H04N 5/232* (2013.01); *H04N 5/23229* (2013.01); *H04N 5/23238* (2013.01); *H04L 61/2007* (2013.01); *H04L 67/02* (2013.01); *H04L 67/42* (2013.01); *H04N 7/18* (2013.01)

(58) Field of Classification Search
CPC ................................................. H04N 5/23206
USPC ....................................................... 348/207.1
See application file for complete search history.

(56) References Cited

U.S. PATENT DOCUMENTS

| 8,724,007 B2 | 5/2014 | Chen et al. | |
| 2007/0198999 A1* | 8/2007 | Ohhashi | G06F 9/54 719/328 |
| 2008/0151058 A1* | 6/2008 | Xu | G06F 3/005 348/207.1 |

* cited by examiner

*Primary Examiner* — Joel W Fosselman
(74) *Attorney, Agent, or Firm* — The Farrell Law Firm, P.C.

(57) ABSTRACT

Disclosed is an electronic device including a memory; and a processor, wherein the memory stores instructions which when executed, cause the processor to load a virtual server in the memory when a connection of a camera to the electronic device is detected, receive at least one image from the camera, control processing of the at least one image through the virtual server, and provide the at least one image processed through the virtual server to an application corresponding to the virtual server.

20 Claims, 22 Drawing Sheets

ELECTRONIC DEVICE CONNECTED TO CAMERA AND METHOD OF CONTROLLING SAME

PRIORITY

This application claims priority under 35 U.S.C. § 119(a) to Korean Patent Application Serial No. 10-2016-0147741, which was filed in the Korean Intellectual Property Office on Nov. 7, 2016, the entire content of which is incorporated herein by reference.

BACKGROUND

1. Field of the Disclosure

The present disclosure relates to an electronic device connected to a camera and a method of controlling the same and, more particularly, to an electronic device capable of executing an application using an image captured by a camera and a method of controlling the same.

2. Description of the Related Art

High-performance cameras are actively being introduced. For example, a camera capable of capturing an image at 360 degrees may include a plurality of lenses and capture an image in a plurality of different directions. After capturing the image in a plurality of different directions, the camera may generate one wide angle image by stitching the image in different directions. The camera may transmit the generated wide angle image to an electronic device that can use the image, for example, a personal computer or a smart phone. An electronic device connected to the camera may provide a virtual reality (VR) service based on the received wide angle image. For example, the electronic device may be implemented as a head mounted display (HMD) or combined with the HMD, and may display a partial area of the wide angle image depending on a user's eye direction. The user may watch the part corresponding to the eye direction and thus receive a virtual reality service as if the user would view a new area by turning his/her head in real reality.

An application using an image may acquire data by capturing an image based on a client-server type defined in a hypertext transfer protocol (HTTP). In this case, an application executed by an electronic device may operate as a client and a camera providing data may operate as a server. In order to meet the operation of the application as described above, the conventional camera should be allocated an internet protocol (IP) address to operate as the server and should include a communication module (e.g., a Wi-Fi module) for Internet communication. However, due to the installation of a communication circuit for Internet communication, a high-performance processor for executing an Internet protocol stack, and a memory, the total cost and size of the camera may increase. Further, a relatively low-performance camera cannot meet the needs of the above application, thus making it difficult to implement a camera that meets all of various demands of third party applications. In addition, when a particular application is updated, a camera may itself need to also be updated.

SUMMARY

The present disclosure has been made to solve the above-described problems or other problems, and provides an electronic device capable of executing a virtual server corresponding to at least one of an application and a connected camera to process an image according to a request of various applications and provide the processed image to the application, and a method of controlling the same.

In accordance with an aspect of the present disclosure, an electronic device is provided. The electronic device includes a memory; and a processor, wherein the memory stores instructions which when executed, cause the processor to load a virtual server in the memory when a connection of a camera to the electronic device is detected, receive at least one image from the camera, control processing of at least one image through the virtual server, and provide at least one image processed through the virtual server to an application corresponding to the virtual server.

In accordance with another aspect of the present disclosure, a method of controlling an electronic device is provided. The method includes executing a virtual server when a connection of a camera to the electronic device is detected; identifying an application using at least one image from the camera or identifying an execution of the application in an external electronic device; receiving at least one image from the camera and processing the at least one image through the virtual server; and providing the at least one image processed through the virtual server to the application.

In accordance with another aspect of the present disclosure, a camera is provided. The camera includes a plurality of photographing devices, each of which acquires at least one image; a memory; and a processor. The memory stores instructions which when executed, cause the processor to detect a connection of a camera to an external electronic device, detect an execution of an application for processing the at least one image in the external electronic device, load a virtual server corresponding to the application in the memory, control processing of the at least one image through the virtual server, and provide the at least one image processed through the virtual server to the application of the external electronic device.

In accordance with another aspect of the present disclosure, a server is provided. The server includes a communication circuit; a memory; and a processor, wherein the memory stores instructions to cause, when executed, the processor to load a virtual server in the memory when a communication circuit receives a request for a processed image from an application executed in an electronic device, process at least one image through the virtual server when the at least one image is received from a camera through the communication circuit, and control the communication circuit to provide the processed image to the application executed by the electronic device from the virtual server.

In accordance with another aspect of the present disclosure, a method of controlling a camera is provided. The method includes capturing at least one image; detecting a connection of the camera to an external electronic device; detecting an execution of an application for processing the at least one image in the external electronic device; loading a virtual server corresponding to the application in the memory; processing the at least one image through the virtual server; and providing the image processed through the virtual server to the application of the external electronic device. In accordance with another aspect of the present disclosure, a method of controlling a server is provided. The method includes executing a virtual server when a communication circuit receives a request for a processed image from an application executed by an electronic device; processing at least one image through the virtual server when the at least one image is received from a camera; and providing the processed image to the application executed by the electronic device from the virtual server.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
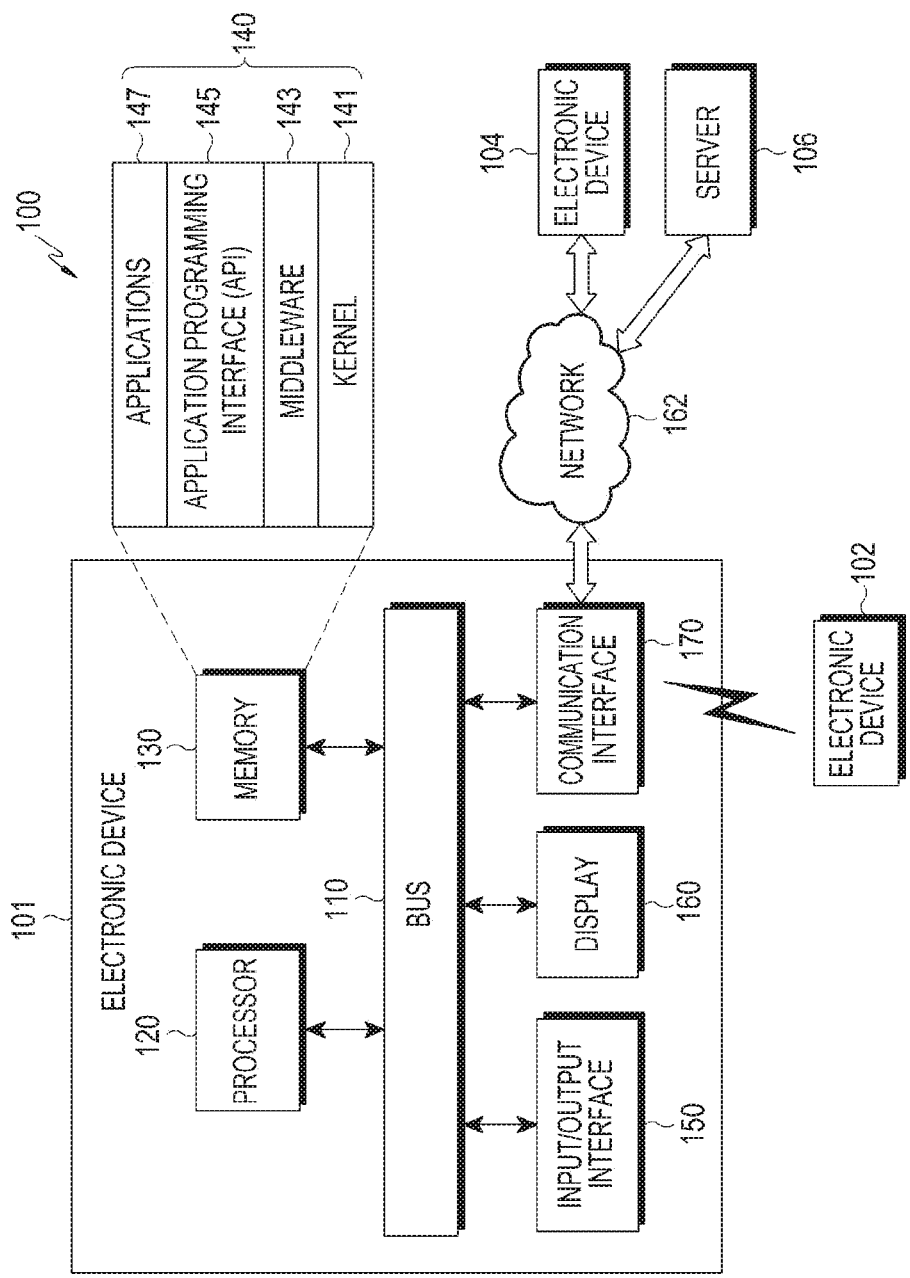
FIG. 1 is a block diagram of an electronic device and a network according to various embodiments of the present disclosure.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise.

The expressions "a first", "a second", "the first", or "the second" used in various embodiments of the present disclosure may modify various components regardless of the order and/or the importance but do not limit the corresponding components. When an element (e.g., first element) is referred to as being "(functionally or communicatively) connected" or "directly coupled" to another element (e.g., second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or an HMD), a fabric or clothing integrated type (e.g., an electronic clothing), a body-mounted type (e.g., a skin pad, or tattoo), and a bio-implantable type (e.g., an implantable circuit). The electronic device may include at least one of, for example, a television, a digital versatile disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In embodiments of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM), a point of sales (POS) device, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

An electronic device may include at least one of a part of furniture or a building/structure, an electronic board, an electronic signature receiving device, a projector, and various types of measuring instruments (e.g., a water meter, an electric meter, a gas meter, a radio wave meter, and the like). The electronic device may be flexible, or may be a combination of one or more of the aforementioned various devices. The electronic device is not limited to the above described devices. In the present disclosure, the term "user" may indicate a person using an electronic device or a device (e.g., an artificial intelligence electronic device) using an electronic device. The term "and/or" covers a combination of a plurality of items, or any of the plurality of items.

Referring to FIG. 1, an electronic device 101 within a network environment 100 according to various embodiments of the present disclosure will be described. The electronic device 101 may include a bus 110, a processor 120, a memory 130, an input/output interface 150, a display 160, and a communication circuit 170. The electronic device 101 may omit at least one of the elements, or may further include other elements. The bus 110 may include, for example, a circuit that interconnects the elements 120 to 170 and transmits communication (e.g., control messages or data) between the elements. The processor 120 may include one or more of a central processing unit, an application processor, and a communication processor (CP). The processor 120, for example, may carry out operations or data processing relating to the control and/or communication with at least one other element of the electronic device 101.

The memory 130 may include a volatile and/or non-volatile memory. The memory 130 may store, for example, instructions or data relevant to at least one other element of the electronic device 101. According to an embodiment of the present disclosure, the memory 130 may store software and/or a program 140. The program 140 may include, for example, a kernel 141, middleware 143, an application programming interface (API) 145, and/or applications 147. At least some of the kernel 141, the middleware 143, and the API 145 may be referred to as an operating system (OS). The kernel 141 may control or manage system resources (e.g., the bus 110, the processor 120, or the memory 130) used for executing an operation or function implemented by other programs (e.g., the middleware 143, the API 145, or the applications 147). Furthermore, the kernel 141 may provide an interface through which the middleware 143, the API 145, or the applications 147 may access the individual elements of the electronic device 101 to control or manage the system resources.

The middleware 143 may function as, for example, an intermediary for allowing the API 145 or the applications 147 to communicate with the kernel 141 to exchange data. In addition, the middleware 143 may process one or more task requests received from the applications 147 according to the assigned priorities. For example, the middleware 143 may assign priorities for using the system resources (e.g., the bus 110, the processor 120, the memory 130, or the like) of the electronic device 101 to one or more of the applications 147, and may process the one or more task requests. The API 145 is an interface used by the applications 147 to control a function provided from the kernel 141 or the middleware 143, and may include, for example, at least one interface or function (e.g., an instruction) for a file control, a window control, image processing, a character control, or the like. For example, the input/output interface 150 may forward instructions or data, which is input from a user or an external device, to the other element(s) of the electronic device 101, or may output instructions or data, which is received from the other element(s) of the electronic device 101, to the user or the external device.

The display 160 may include, for example, a liquid crystal display (LCD), a light emitting diode (LED) display, an organic light emitting diode (OLED) display, a micro electro mechanical system (MEMS) display, or an electronic paper display. The display 160 may display, for example, various types of content (e.g., text, images, videos, icons, and/or symbols) for a user. The display 160 may include a touch screen and may receive, for example, a touch, a gesture, a proximity, or a hovering input using an electronic pen or the user's body part. The communication interface 170 may configure communication, for example, between the electronic device 101 and an external device (e.g., a first external electronic device 102, a second external electronic device 104, or a server 106). For example, the communication interface 170 may be connected to a network 162 through wireless or wired communication to communicate with the external device (e.g., the second external electronic device 104 or the server 106).

The wireless communication may include, for example, a cellular communication that uses at least one of LTE, LTE-Advance (LTE-A), code division multiple access (CDMA), wideband CDMA (WCDMA), universal mobile telecommunications system (UMTS), wireless broadband (WiBro), global system for mobile communications (GSM), or the like. According to an embodiment of the present disclosure, the wireless communication may include, for example, at least one of Wi-Fi, Bluetooth™, Bluetooth low energy (BLE), ZigBee, near field communication (NFC), magnetic secure transmission, Radio Frequency (RF), and body area network (BAN). The wired communication may include a global navigation satellite system (GNSS). The GNSS may be, for example, a GPS, a global navigation satellite system (Glonass), a Beidou navigation satellite system (Beidou), or Galileo (the European global satellite-based navigation system). Hereinafter, in this disclosure, the term "GPS" may be interchangeably used with the term "GNSS". The wired communication may include, for example, at least one of a universal serial bus (USB), a high definition multimedia interface (HDMI), a recommended standard 232 (RS-232), a plain old telephone service (POTS), and the like. The network 162 may include a telecommunications network, for example, at least one of a computer network (e.g., a LAN or a WAN), the Internet, and a telephone network.

Each of the first and second external electronic devices 102 and 104 may be of the same or a different type from the electronic device 101. According to various embodiments of the present disclosure, all or some of the operations executed in the electronic device 101 may be executed in another electronic device or a plurality of electronic devices (e.g., the electronic devices 102 and 104, or the server 106). When the electronic device 101 has to perform some functions or services automatically or in response to a request, the electronic device 101 may make a request for performing at least some functions relating thereto to another device (e.g., the electronic device 102 or 104, or the server 106) instead of performing the functions or services by itself. The another electronic device may execute the requested functions or the additional functions, and may deliver a result of the execution to the electronic apparatus 101. The electronic device 101 may provide the received result as it is, or may perform additional processing on the received result to provide the requested functions or services. To this end, for example, cloud computing, distributed computing, or client-server computing technology may be used.

According to various embodiments of the present disclosure, the memory 130 may store instructions to cause the processor 120, when executed, to load a virtual server in the memory 130 when a connection of a camera to the electronic device 101 is detected, receive at least one image from the camera, control of processing of at least one image through the virtual server, and provide at least one image processed through the virtual server to an application corresponding to the virtual server.

According to various embodiments of the present disclosure, the virtual server may be configured to correspond to at least one of identification information of the camera, the application, and types of at least one image from the camera.

According to various embodiments of the present disclosure, the memory 130 may store instructions to cause the processor 120, when executed, to allocate an IP address and a port number to the virtual server.

According to various embodiments of the present disclosure, the memory 130 may store instructions to cause the processor 120, when executed, to provide a request from the application to the virtual server based on the IP address and the port number of the virtual server.

According to various embodiments of the present disclosure, the memory 130 may store instructions to cause the processor 120, when executed, to provide at least one image processed through the virtual server to the application in response to the request from the application. The provision of the request and the response may be performed based on a HTTP client-server type.

According to various embodiments of the present disclosure, the memory 130 may store instructions to cause the processor 120, when executed, to provide the request to the virtual server through a higher API between the virtual server and the application, and provide the request to the camera through a lower API between the virtual server and a lower level of the virtual server.

According to various embodiments of the present disclosure, the memory 130 may store instructions to cause the processor 120, when executed, to receive at least one image from the camera through a lower API between the virtual server and a lower level of the virtual server, and provide at least one processed image to the application as the response based on a higher API between the virtual server and the application.

According to various embodiments of the present disclosure, the memory 130 may store instructions to cause the processor 120, when executed, to convert the response to a format that can be processed by the application and provide the converted response to the application.

According to various embodiments of the present disclosure, the memory 130 may store instructions to cause the processor 120, when executed, to load a library corresponding to a processing function from an engine for processing at least one image and to process at least one image based on the loaded library.

According to various embodiments of the present disclosure, the memory 130 may store instructions to cause the processor 120, when executed, to stitch at least one image into one image and to provide the stitched image to the applications 147.

A camera according to another embodiment of the present disclosure may include a plurality of photographing devices, each of which acquires at least one image; a memory; and a processor. The memory may store instructions to cause the processor, when executed, to detect a connection of a camera to an external electronic device, detect an execution of an application for processing at least one image in the external electronic device, load a virtual server corresponding to the application in the memory, control processing of at least one image through the virtual server, and provide at least one image processed through the virtual server to the application of the external electronic device.

A server according to another embodiment of the present disclosure may include a communication circuit, a memory, and a processor. In this case, the memory may store instructions to cause the processor, when executed, to load a virtual server in the memory when a communication circuit receives a request for a processed image from an application executed in an electronic device, process at least one image through the virtual server when at least one image is received from a camera through the communication circuit, and control the communication circuit to provide the processed image to the application executed by the electronic device from the virtual server.

Figure 2:
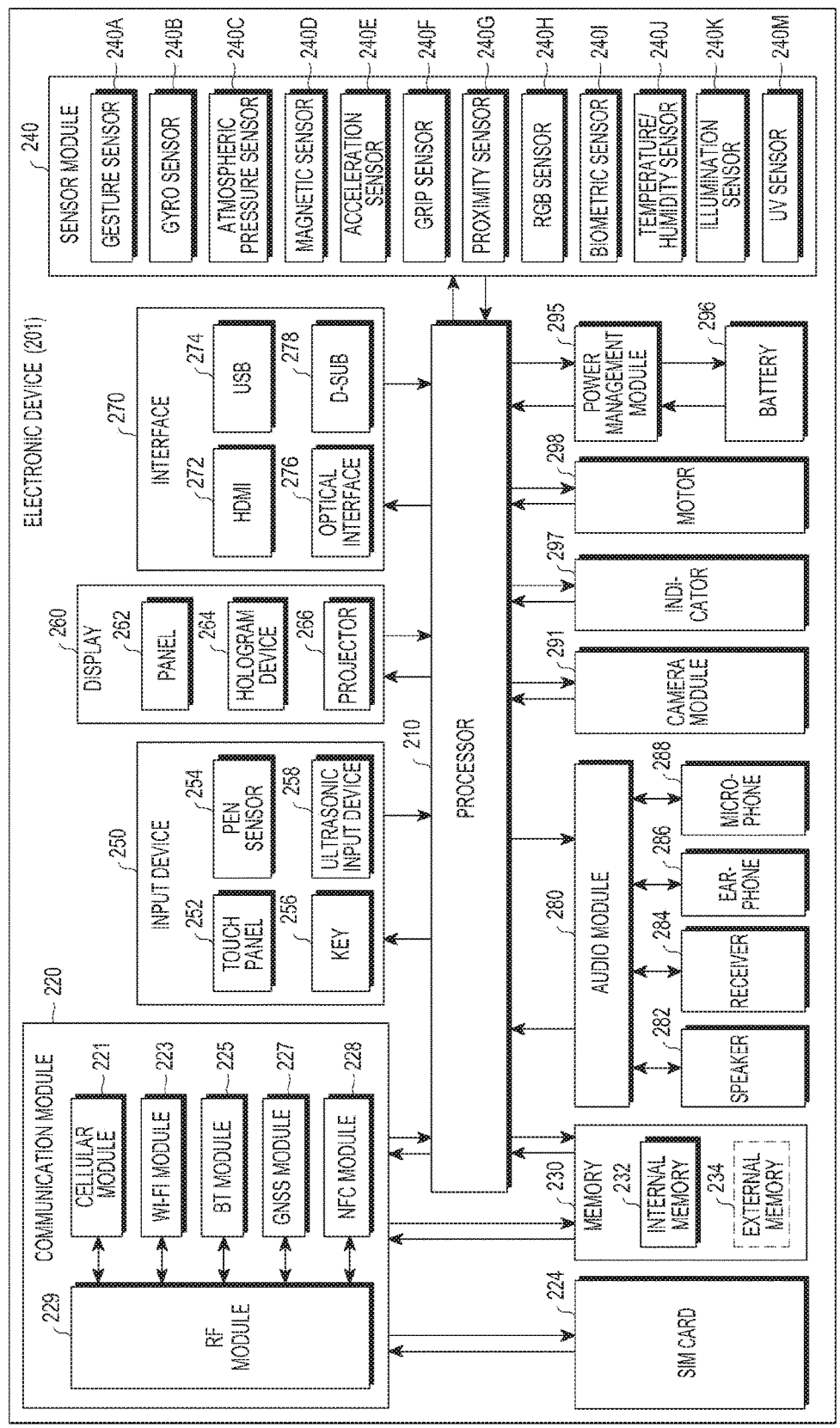
FIG. 2 is a block diagram of the electronic device according to various embodiments of the present disclosure.

FIG. 2 is a block diagram of an electronic device 201 according to various embodiments of the present disclosure. The electronic device 201 may include, for example, the whole or part of the electronic device 101 illustrated in FIG. 1. The electronic device 201 may include at least one processor 210 (e.g., an AP), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto and may perform various data processing and operations by driving an operating system or an application. The processor 210 may be implemented by, for example, a system on chip (SoC). The processor 210 may further include a graphic processing unit (GPU) and/or an image signal processor (ISP). The processor 210 may also include at least some (e.g., a cellular module 221) of the elements illustrated in FIG. 2. The processor 210 may load, in volatile memory, instructions or data received from at least one of the other elements (e.g., non-volatile memory), process the loaded instructions or data, and store the resultant data in the non-volatile memory.

The communication module 220 may have a configuration that is the same as or similar to that of the communication interface 170. The communication module 220 may include, for example, a cellular module 221, a Wi-Fi module 223, a Bluetooth (BT) module 225, a GNSS module 227, an NFC module 228, and an RF module 229. The cellular module 221 may provide, for example, a voice call, a video call, a text message service, an Internet service, or the like through a communication network. According to an embodiment of the present disclosure, the cellular module 221 may identify and authenticate the electronic device 201 within a communication network using the SIM 224. The cellular module 221 may perform at least some of the functions that the processor 210 may provide. The cellular module 221 may include a CP. At least some (e.g., two or more) of the cellular module 221, the Wi-Fi module 223, the BT module 225, the GNSS module 227, and the NFC module 228 may be included in one integrated circuit (IC) or IC package. The RF module 229 may transmit/receive, for example, a communication signal (e.g., an RF signal). The RF module 229 may include, for example, a transceiver, a power amp module (PAM), a frequency filter, a low noise amplifier (LNA), an antenna, or the like. At least one of the cellular module 221, the Wi-Fi module 223, the BT module 225, the GPS module 227, and the NFC module 228 may transmit/receive an RF signal through a separate RF module. The SIM 224 may include, for example, a card that includes a subscriber identification module, or an embedded SIM, and may contain unique identification information (e.g., an integrated circuit card identifier (ICCID)) or subscriber information (e.g., international mobile subscriber identity (IMSI)).

The memory 230 (e.g., the memory 130) may include, for example, an internal memory 232 or an external memory 234. The internal memory 232 may include, for example, at least one of a volatile memory (e.g., a DRAM, an SRAM, an SDRAM, or the like) and a non-volatile memory (e.g., a one-time programmable ROM (OTPROM), a PROM, an EPROM, an EEPROM, a mask ROM, a flash ROM, a flash memory, a hard disc drive, or a solid state drive (SSD)). The external memory 234 may include a flash drive, for example, a compact flash (CF), a secure digital (SD), a Micro-SD, a Mini-SD, an eXtreme digital (xD), a multi-media card (MMC), a memory stick, and the like. The external memory 234 may be functionally and/or physically connected to the electronic device 201 through various interfaces.

The sensor module 240 may, for example, measure a physical quantity or detect the operating state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments of the present disclosure, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone 288 to identify data corresponding to the detected ultrasonic waves.

The display 260 may include a panel 262, a hologram device 264, a projector 266, and/or a control circuit for controlling them. The panel 262 may be implemented to be, for example, flexible, transparent, or wearable. The panel 262, together with the touch panel 252, may be configured as one or more modules. According to an embodiment of the present disclosure, the panel 262 may include a pressure sensor or a POS sensor which may measure a strength of pressure from a user's touch. The pressure sensor may be integrated with the touch panel 252 or may be implemented as one or more sensors separate from the touch panel 252. The hologram device 264 may show a three dimensional image in the air by using an interference of light. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) 278. The interface 270 may be included in, for example, the communication interface 170 illustrated in FIG. 1. Additionally or alternatively, the interface 270 may, for example, include a mobile high-definition link (MHL) interface, an SD card/multi-media card (MMC) interface, or an Infrared Data Association (IrDA) standard interface.

The audio module 280 may convert, for example, sound into an electrical signal, and vice versa. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, and the like. The camera module 291 may be a device that can photograph a still image and a moving image. According to an embodiment of the present disclosure, the camera module 291 may include one or more image sensors (e.g., a front sensor or a rear sensor), a lens, an ISP, or a flash (e.g., an LED or xenon lamp).

The power management module 295 may manage, for example, the power of the electronic device 201. The power management module 295 may include a power management integrated circuit (PMIC), a charger IC, or a battery gauge. The PMIC may use a wired and/or wireless charging method. Examples of the wireless charging method may include a magnetic resonance method, a magnetic induction method, an electromagnetic wave method, and the like. Additional circuits (e.g., a coil loop, a resonance circuit, a rectifier, and the like) for wireless charging may be further included. The battery gauge may measure, for example, the residual amount of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (e.g., the processor 210) of the electronic device 201. The motor 298 may convert an electrical signal into a mechanical vibration and may generate a vibration, a haptic effect, or the like. The electronic device 201 may include a mobile TV support device (e.g., a GPU) that can process media data according to a standard, such as digital multimedia broadcasting (DMB), digital video broadcasting (DVB), mediaFlo™, and the like. Each of the above-described component elements of hardware according to the present disclosure may be configured with one or more components, and the names of the corresponding component elements may vary based on the type of electronic device. An electronic device 201 may omit some elements or may further include additional elements, or some of the elements of the electronic device may be combined with each other to configure one entity, in which case the electronic device may identically perform the functions of the corresponding elements prior to the combination.

Figure 3:
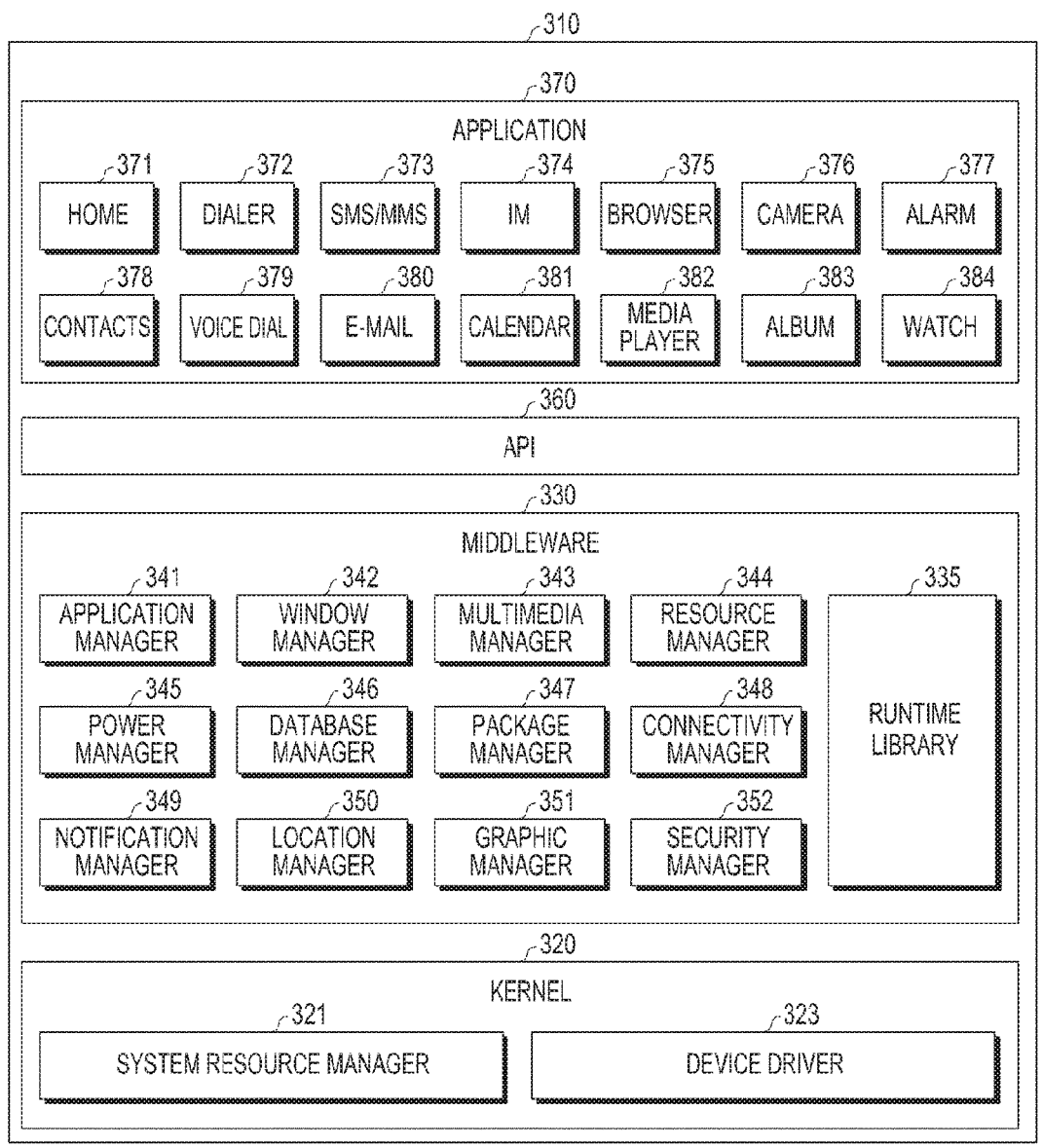
FIG. 3 is a block diagram of a program module according to various embodiments of the present disclosure.

FIG. 3 is a block diagram of a program module according to various embodiments of the present disclosure. The program module 310 may include an OS for controlling resources relating to an electronic device 101 and/or various applications 370 driven in the operating system. The operating system may include, for example, Android™, iOS™, Windows', Symbian™, Tizen™, or Bada™. Referring to FIG. 3, the program module 310 may include a kernel 320, middleware 330, an API 360, and/or applications 370. At least a part of the program module 310 may be preloaded on the electronic device, or may be downloaded from an external electronic device 102 or 104, or the server 106.

The kernel 320 may include, for example, a system resource manager 321 and/or a device driver 323. The system resource manager 321 may control, allocate, or retrieve system resources. According to an embodiment of the present disclosure, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter process communication (IPC) driver. The middleware 330 may provide, for example, a function required by the applications 370 in common, or may provide various functions to the applications 370 through the API 360 such that the applications 370 can efficiently use limited system resources within the electronic device. The middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage an input/output, manage a memory, or process an arithmetic function. The application manager 341 may manage, for example, the life cycles of the applications 370. The window manager 342 may manage GUI resources used for a screen. The multimedia manager 343 may identify formats required for reproducing various media files and may encode or decode a media file using a codec suitable for the corresponding format. The resource manager 344 may manage the source code of the applications 370 or the space of a memory. The power manager 345 may manage, for example, the capacity or power of a battery, and may provide power information required for operating the electronic device. According to an embodiment of the present disclosure, the power manager 345 may operate in conjunction with a basic input/output system (BIOS). The database manager 346 may, for example, generate, search, or change databases to be used by the applications 370. The package manager 347 may manage the installation or update of an application that is distributed in the form of a package file.

The connectivity manager 348 may manage, for example, a wireless connection. The notification manager 349 may provide an event (e.g., an arrival message, an appointment, a proximity notification, and the like) to a user. The location manager 350 may manage, for example, the location information of the electronic device. The graphic manager 351 may manage a graphic effect to be provided to a user and a user interface relating to the graphic effect. The security manager 352 may provide, for example, system security or user authentication. According to an embodiment of the present disclosure, the middleware 330 may include a telephony manager for managing a voice or video call function of the electronic device, or a middleware module that is capable of forming a combination of the functions of the above-described elements. The middleware 330 may provide a module specialized for each type of OS. Furthermore, the middleware 330 may dynamically remove some of the existing elements, or may add new elements. The API 360 is, for example, a set of API programming functions, and may be provided with different configurations depending on the operating system. For example, in the case of Android or iOS, one API set may be provided for each platform, and in the case of Tizen, two or more API sets may be provided for each platform.

The applications 370 may include, for example, one or more applications that can perform functions, such as a home application 371, a dialer application 372, an SMS/MMS application 373, an instant messaging (IM) application 374, a browser application 375, a camera application 376, an alarm application 377, a contact application 378, a voice dialer application 379, an e-mail application 380, a calendar application 381, a media player application 382, an album application 383, a watch application 384, a healthcare application (e.g., measuring exercise quantity or blood glucose level), environmental information (e.g., atmospheric pressure, humidity, or temperature information) application, and the like. According to an embodiment of the present disclosure, the applications 370 may include an information exchange application that can support the exchange of information between the electronic device and an external electronic device. The information exchange application may include, for example, a notification relay application for relaying information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may install, delete, or update the functions (e.g., turning on/off the external electronic device itself or some elements thereof, or adjusting the brightness or resolution of a display) of an external electronic device that communicates with the electronic device or applications executed in the external electronic device. The applications 370 may include applications (e.g., a healthcare application of a mobile medical appliance) that are designated according to the attributes of an external electronic device. The applications 370 may include applications received from an external electronic device. At least some of the program module 310 may be implemented (e.g., executed) by software, firmware, hardware (e.g., the processor 210), or a combination of two or more thereof, and may include a module, a program, a routine, an instruction set, or a process for performing one or more functions.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an application specific integrated circuit (ASIC) chip, a field programmable gate arrays (FPGA), or a programmable logic device, which has been known or are to be developed in the future, for performing certain operations. At least some of devices (e.g., modules or functions thereof) or methods (e.g., operations) according to various embodiments of the present disclosure may be implemented by an instruction which is stored a computer-readable storage medium (e.g., the memory 130) in the form of a program module. The instruction, when executed by a processor (e.g., the processor 120), may cause one or more processors to execute the function corresponding to the instruction. The computer-readable storage medium may include a hard disk, a floppy disk, a magnetic medium (e.g., a magnetic tape), an optical media (e.g., CD-ROM or DVD), a magneto-optical media (e.g., a floptical disk), an inner memory, etc. The instruction may include code made by a complier or code that can be executed by an interpreter. Operations performed by a module, a programming module, or other elements may be executed sequentially, in parallel, repeatedly, or in a heuristic manner. At least some operations may be executed according to another sequence, may be omitted, or may further include other operations.

Figure 4A:
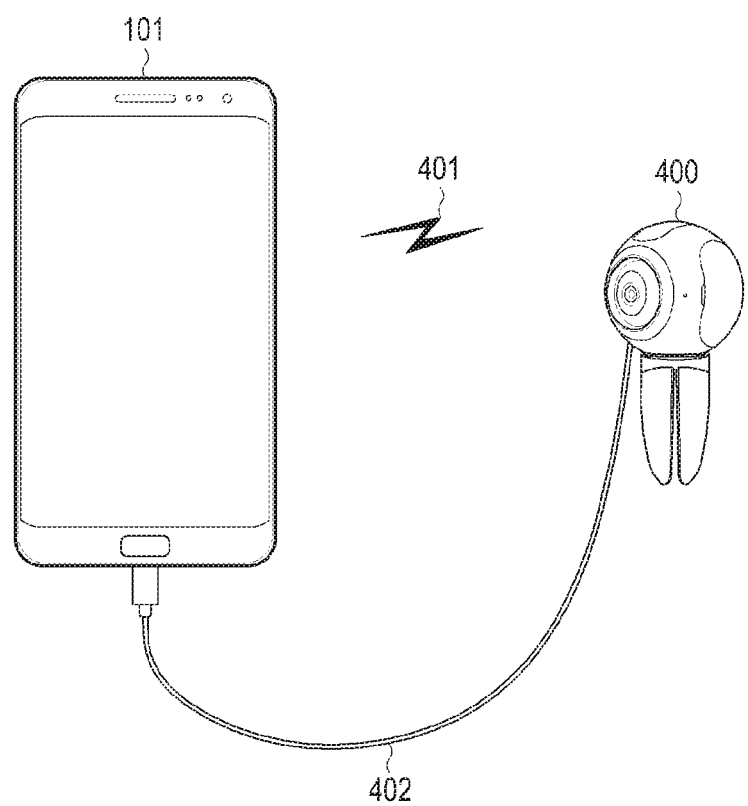
FIG. 4A is a conceptual diagram illustrating an electronic device and a camera according to various embodiments of the present disclosure.

FIG. 4A is a conceptual diagram illustrating an electronic device and a camera according to various embodiments of the present disclosure.

As illustrated in FIG. 4A, the electronic device 101 may be connected to a camera 400. For example, the electronic device 101 may be connected through a wire to the camera 400 through a cable 402. The cable 402 may be manufactured based on, for example, a USB standard, and may include connectors according to various USB standards. Further, the electronic device 101 and the camera 400 may also include physical ports according to various USB standards, and accordingly, may be connected to each other through the cable 402. Alternatively, the electronic device 101 may be wirelessly connected to the camera 400. The electronic device 101 and the camera 400 may include a communication circuit that supports various short-range communication schemes such as a Bluetooth™ scheme, a BLE scheme, an NFC scheme, and a Zig-bee scheme. The electronic device 101 and the camera 400 may wirelessly transmit and receive a signal 401 through a communication circuit.

Figure 4B:
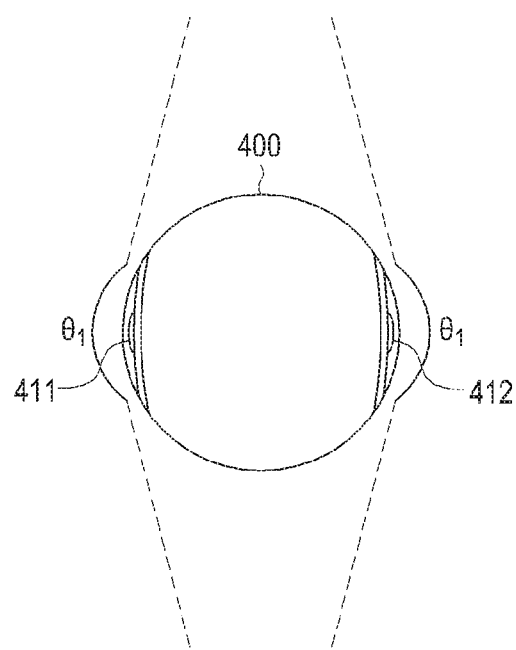
FIG. 4B is a conceptual diagram illustrating the camera according to various embodiments of the present disclosure.

The camera 400 may capture an image of an exterior landscape. The camera 400 may include, for example, a plurality of photographing devices with respect to a plurality of directions as illustrated in FIG. 4B, and acquire a plurality of images with respect to the plurality of directions. Each of the plurality of photographing devices including the camera 400 may include, for example, a fish-eye lens and may have, for example, a view angle ($\theta_1$) greater than 180 degrees. The plurality of photographing devices may be arranged such that their view angles partially overlap each other, and accordingly, images captured by the plurality of photographing devices may include parts that overlap each other. The camera 400 may stitch the plurality of captured images into one image and transmit the one image to the electronic device 101. Alternatively, the camera 400 may transmit the plurality of images to the electronic device 101 and then the electronic device 101 may stitch the plurality of images into one image.

The electronic device 101 may include an application for various wide angle image processing. The electronic device 101 may execute a virtual server corresponding to at least one of the connected camera 400 and the executed application. The virtual server may process the plurality of images received from the camera 400 in the stitching type or another type, and provide the processed image to the application. The execution of the virtual server will be described below in more detail.

Figure 4C:
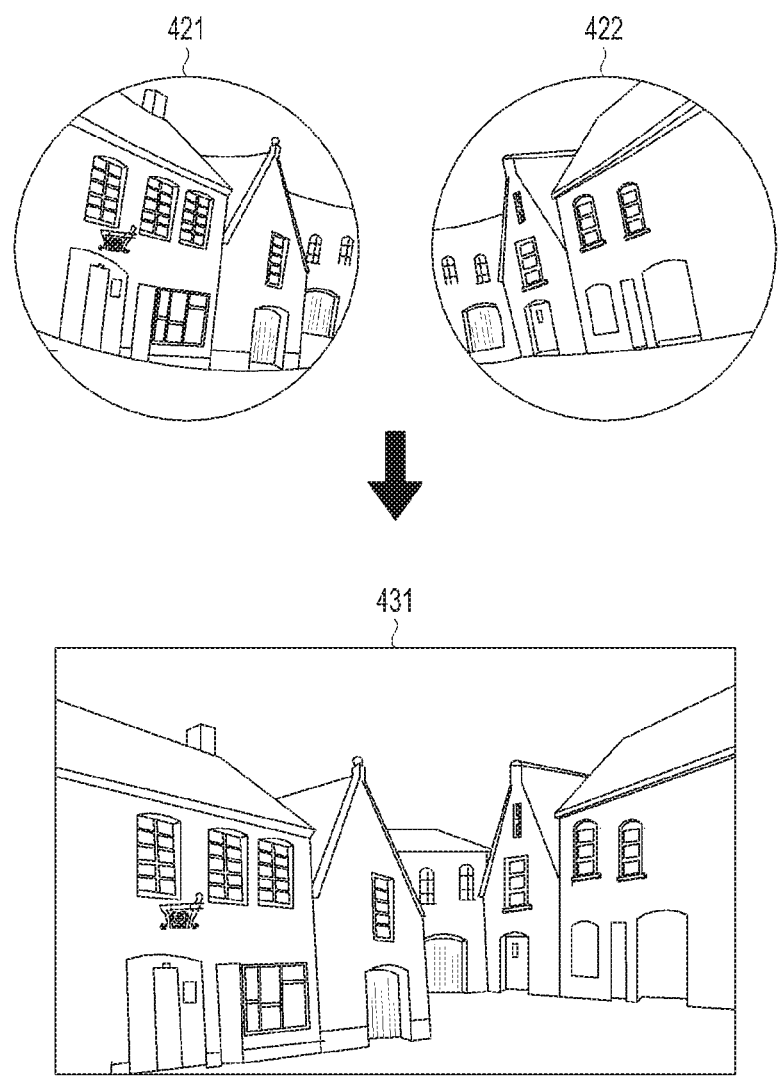
FIG. 4C is a conceptual diagram illustrating image stitching according to various embodiments of the present disclosure.

FIG. 4B is a conceptual diagram illustrating the camera according to various embodiments of the present disclosure. Referring to FIG. 4B, the camera 400 may include, for example, two photographing devices 411 and 412. Each of the two photographing devices 411 and 412 may include a lens having a view angle of $\theta_1$. The lens may be a fish-eye lens and $\theta_1$ may be greater than or equal to 180 degrees. Accordingly, the camera 400 may acquire two images 421 and 422 illustrated in FIG. 4C, and may generate one wide angle image 431 by stitching the two images 421 and 422, and the wide angle image 431 may be used by various applications executed by the electronic device 101. The number of photographing devices 411 and 412 in FIG. 4B is only an example, and it may be easily understood by those skilled in the art that there is no limitation in the number of photographing devices.

Figure 5:
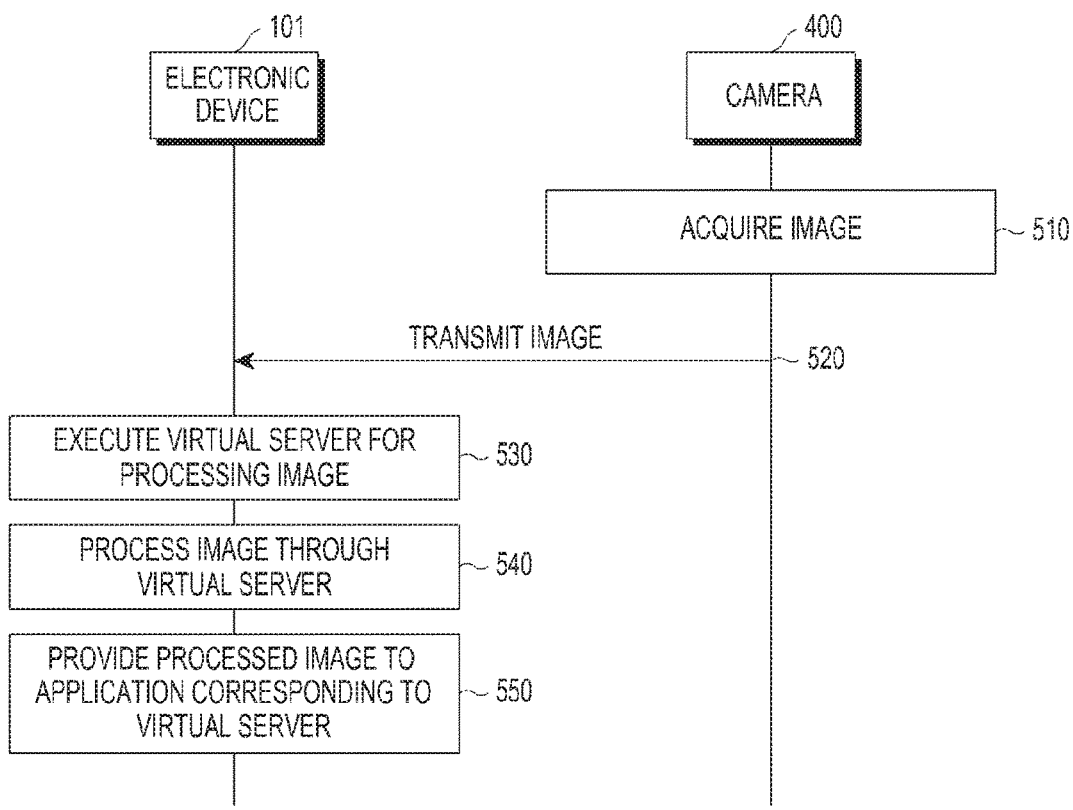
FIG. 5 is a flowchart illustrating a method of controlling the electronic device according to various embodiments of the present disclosure.

FIG. 5 is a flowchart illustrating a method of controlling the electronic device according to various embodiments of the present disclosure. Hereinafter, the performance of a particular operation by the electronic device or the camera may refer to the performance of the particular operation by a process included in the electronic device or the camera. Alternatively, the performance of a particular operation by the electronic device or the camera may mean that a process included in the electronic device or the camera controls other hardware included in the electronic device or the camera to perform the particular operation.

In step 510, the camera 400 may acquire images. As described above, the camera 400 may include a plurality of photographing devices arranged in different directions with respect to a plurality of directions, and acquire images captured by the plurality of photographing devices. According to another embodiment of the present disclosure, the camera 400 may acquire one image.

In step 520, the camera 400 may transmit the acquired images to the electronic device 101. The camera 400 may transmit the images to the electronic device 101 by wired and/or wireless communication. In step 530, the electronic device 101 may execute a virtual server for processing the images. The virtual server may refer to a programmatic server executed by the electronic device 101, and not to hardware separated from the electronic device 101, which actually stores and manages data. The virtual server may refer to, for example, a program, which satisfies an operation corresponding to a server defined in a client-server architecture, e.g. in the HTTP, and accordingly, an IP address and a port number may be allocated to the virtual server. In the client-server architecture defined in the HTTP, a client may transmit a request for getting particular data to a server. In order to allow the client to receive the request, the server should have an IP address and a port number, and accordingly, the electronic device 101 may allocate the IP address and the port number to the virtual server. The virtual server may be executed by loading the instructions for the virtual server into a RAM of the electronic device 101.

The virtual server may be created in advance to correspond to the application and the connected camera. For example, various types of virtual servers shown in Table 1 may be stored in the electronic device 101.

TABLE 1

|  | First application | Second application |
|---|---|---|
| First type camera | First virtual server | Second virtual server |
| Second type camera | Third virtual server | Fourth virtual server |

As shown in Table 1, even though the same type of camera is connected, a different virtual server may be executed depending on an executed application. Further, even though the same application is executed, a different virtual server may be executed depending on the type of connected camera. The virtual server may process data received from connected hardware, that is, the camera in a type required by the application and provide a processing result to the application. Accordingly, when the type of camera is different or the application is different, a different API may be called, and accordingly, a different virtual server may be executed depending on the type of camera or application. That is, APIs called and used by respective virtual servers may be different. Meanwhile, Table 1 is only an example, and in various embodiments of the present disclosure, the same virtual server may be executed even though the type of connected camera is different and the same application is executed. Alternatively, virtual servers corresponding to different applications may be the same.

In step 540, the electronic device 101 may process the images through the virtual server. In step 550, the electronic device 101 may provide the processed images to the application corresponding to the virtual server. The virtual server may receive and process data; that is, images from the camera 400. The virtual server may call a lower API defined between the camera 400 and the virtual server, and a higher API defined between the virtual server and the application. The lower API may refer to an API between the virtual server and at least one of lower levels of the virtual server. The virtual server may receive data, that is, images from the camera 400 through the API and provide the processed images to the application.

The virtual server may include various processing engines or interact with the various processing engines. The processing engine may include, for example, a stitching engine. The virtual server may load, for example, a stitching library from the stitching engine and stitch a plurality of images into one wide angle image based on the loaded stitching library. The virtual server may provide the stitched image to the application. However, the stitching is only one example of processing schemes by the virtual server, and the virtual server may include various engines according to various processing schemes or interact with the various engines. Various processing schemes may include a processing scheme requested by the application that requests images, and accordingly the virtual server may include an engine related to the processing scheme requested by the application or interact with the engine related to the processing scheme requested by the application. According to another embodiment of the present disclosure, the virtual server may be implemented to include an engine that supports various processing functions.

The electronic device 101 may process images from various types of cameras required by various applications and provide the processed images. As described above, the image processing type may be set by the application according to the request. However, since the virtual server executed by the electronic device 101 may process the images in the corresponding processing type, the independence of the camera 400 from the application can be guaranteed. Further, since the virtual server may receive an IP address and a port number, and thus may operate as a server even when an application based on the server-client scheme of the HTTP is executed, the camera 400 does not need to have an IP address and a port number. As a result, although the camera 400 includes only a USB port capable of simply transmitting images to the electronic device 101, the camera 400 can provide images processed in the type requested by the application based on the server-client scheme of the HTTP.

Figure 6:
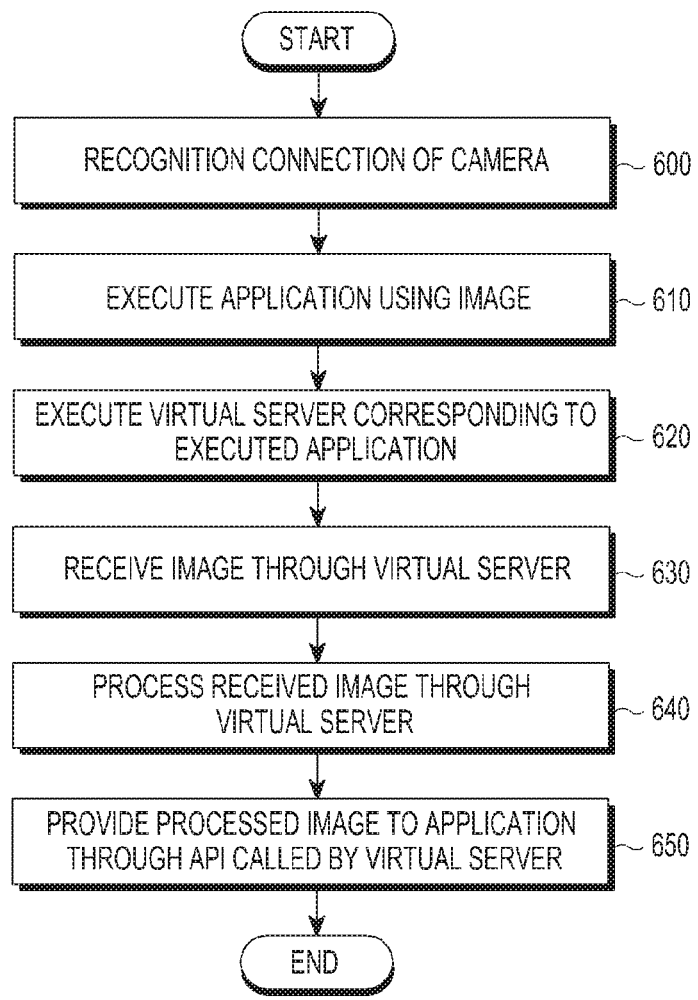
FIG. 6 is a flowchart illustrating the operation of the electronic device according to various embodiments of the present disclosure.
Figure 7:
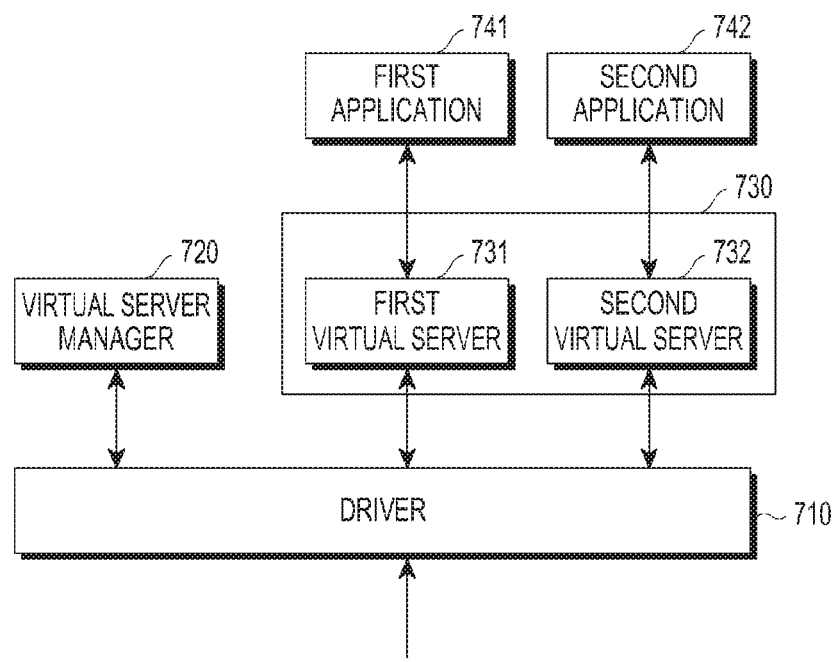
FIG. 7 is a conceptual diagram illustrating the virtual server according to various embodiments of the present disclosure.

FIG. 6 is a flowchart illustrating the operation of the electronic device according to various embodiments of the present disclosure. The embodiment of FIG. 6 will be described in more detail with reference to FIG. 7. FIG. 7 is a conceptual diagram illustrating the virtual server according to various embodiments of the present disclosure.

In step 600, the electronic device 101 may recognize a connection of the camera. For example, the electronic device 101 may be connected through a wire to the camera. The electronic device 101 may be connected to the camera through a USB cable, and in this case, may receive identification information of the camera through a data line defined in the USB. Alternatively, the electronic device 101 may perform wireless communication with the camera. A communication circuit of the electronic device 101 may receive a communication signal from the camera, and determine the identification information of the camera by checking data included in the communication signal.

In step 610, the electronic device 101 may execute an application using an image. The electronic device 101 may execute the application according to, for example, a user's selection. Alternatively, the electronic device 101 may execute an application corresponding to the identification information of the connected camera.

In step 620, the electronic device 101 may execute a virtual server corresponding to the executed application. As described above, the electronic device 101 may store in advance a virtual server corresponding to each of the stored applications. The electronic device 101 may load the virtual server corresponding to the executed application in a RAM. According to various embodiments of the present disclosure, the electronic device 101 may execute virtual servers corresponding to both the executed application and the connected camera. Alternatively, the electronic device 101 may execute all virtual servers corresponding to the connected cameras.

According to various embodiments of the present disclosure, the electronic device 101 may include a virtual server manager 720 as illustrated in FIG. 7. The virtual server manager 720 may be defined in an application layer or a framework layer. The virtual server manager 720 may manage the execution of the virtual server and execute the virtual server in accordance with the connection of the camera. For example, the identification information of the camera may be transmitted to the virtual server manager 720 through a driver 710. In this present disclosure, it may be understood that the performance of a particular operation by a manager such as the virtual server manager 720 refers to the execution of a program corresponding to the virtual server manager 720 after the program is loaded in a storage device within the electronic device 101, such as a RAM, or may mean that the processor of the electronic device 101 performs the particular operation or the processor controls other hardware to perform the particular operation.

As described above, the identification information of the camera may be transmitted to the electronic device 101 through wired or wireless communication, and may be input into the driver 710. The virtual server manager 720 may execute all virtual servers corresponding to the received identification information of the camera, or execute the virtual server corresponding to the identification information of the camera and the executed application. For example, the connected camera may be a first type and virtual servers corresponding to the first type of camera may be a first virtual server 731 and a second virtual server 732. In this case, the virtual server manager 720 may receive identification information of the first type camera through the driver 710. The virtual server manager 720 may execute the first virtual server 731 and the second virtual server 732 corresponding to the identification information of the first type camera. Meanwhile, a first application 741 may correspond to the first virtual server 731 and a second application 742 may correspond to the second virtual server 732. The electronic device 101 may execute the first application 741 and execute the first virtual server 731 corresponding to the first application 741.

In step 630, the electronic device 101 may receive images through the virtual server. For example, referring to FIG. 7, the electronic device 101 may transmit data received from the camera through the driver 710 to a virtual server backend 730 including the first virtual server 731 or the second virtual server 732. The first virtual server 731 may call a higher API defined between the first application 741 and the first virtual server 731, and a lower API defined between the first virtual server 731 and the driver 710 or a lower level API. For example, the first virtual server 731 may call the following higher API:

"GET/osc/info HTTP/1.1
Host: [virtual server ip address]:[httpPort]
Accept: application/json
X-XSRF-Protected: 1".

The higher API may be an example of a GET instruction that makes a request for data from the camera, for example, for camera-related information. An IP address and a port number assigned to the first virtual server 731 may have a virtual server IP address and httpPort in a host. The first virtual server 731 may call the lower API mapped to the higher API. For example, a higher API of GET/osc/info HTTP/1.1 may store in advance information indicating that the higher API of GET/osc/info HTTP/1.1 is mapped to a lower API of camera module to get camera info. Here, "osc" refers to an Open Spherical camera and may mean the standard that provides an API associated with a function of a spherical camera. The first virtual server 731 may call the lower API based on the information stored in advance, and the GET instruction may be transmitted to the camera. As described above, while the higher API may be written based on the HTTP, the lower API may be written in another type, based on a protocol other than HTTP. This means that the first application 741 makes a request for data based on the client-server type using the HTTP and receives a response thereto. Further, although the camera does not support HTTP, data can be transmitted to the first application 741 in the client-server type based on the HTTP. The camera having received the GET instruction, that is, the request for data may transmit information contained in the GET instruction to the driver 710 as a response. For example, as described above, the camera having received the camera-related information by the higher API and the lower API may transmit camera-related information, for example, manufacturer and model information, and a serial number to the driver 710 as a response. When the first application 741 transmits an instruction to request images to the first virtual server 731, the camera may receive the instruction to request images through the lower API called from the first virtual server 731. Further, the camera may transmit images to the driver 710 in response to the request.

When the images are received from the camera, the electronic device 101 may process the received images through the virtual server in step 640. For example, the first virtual server 731 may receive a plurality of images from the camera, stitch the plurality of images, and transmit the stitched image to the first application 741. In step 650, the electronic device 101 may provide the processed image to the application through the API called by the virtual server. As described above, when the first application 741 makes a request for the camera-related information, the camera may transmit, for example, the following camera-related information to the first virtual server 731 through the driver 710:

```
"manufacturer_model" AAA_BBB
SN              CCC".
```

The first virtual server 731 may change the acquired data to be in a format defined in the higher API and transmit the changed data to the first application 741. For example, the first virtual server 731 may transmit the following changed format data to the first application 741:

```
"HTTP/1.1 200 OK
Content-Type: application/json; charset=utf-8
Content-Length: {CONTENT_LENGTH}
X-Content-Type-Options: nosniff
{
  "manufacturer": "AAA",
  "model": "BBB",
  "serialNumber": "CCC"
}".
```

Accordingly, the first application 741 supporting the HTTP client-server type may receive the changed format data and acquire camera-related information, for example, manufacturer information, model information, and the serial number. When the images are received, the first virtual server 731 may stitch the received images, convert the stitched image according to the format defined in the HTTP client-server type, and provide the changed image to the first application 741.

As described above, data, for example, the camera-related information or the images, can be provided from the camera, which does not support the HTTP client-server type, to the application, which supports the HTTP client-server type.

Figure 8:
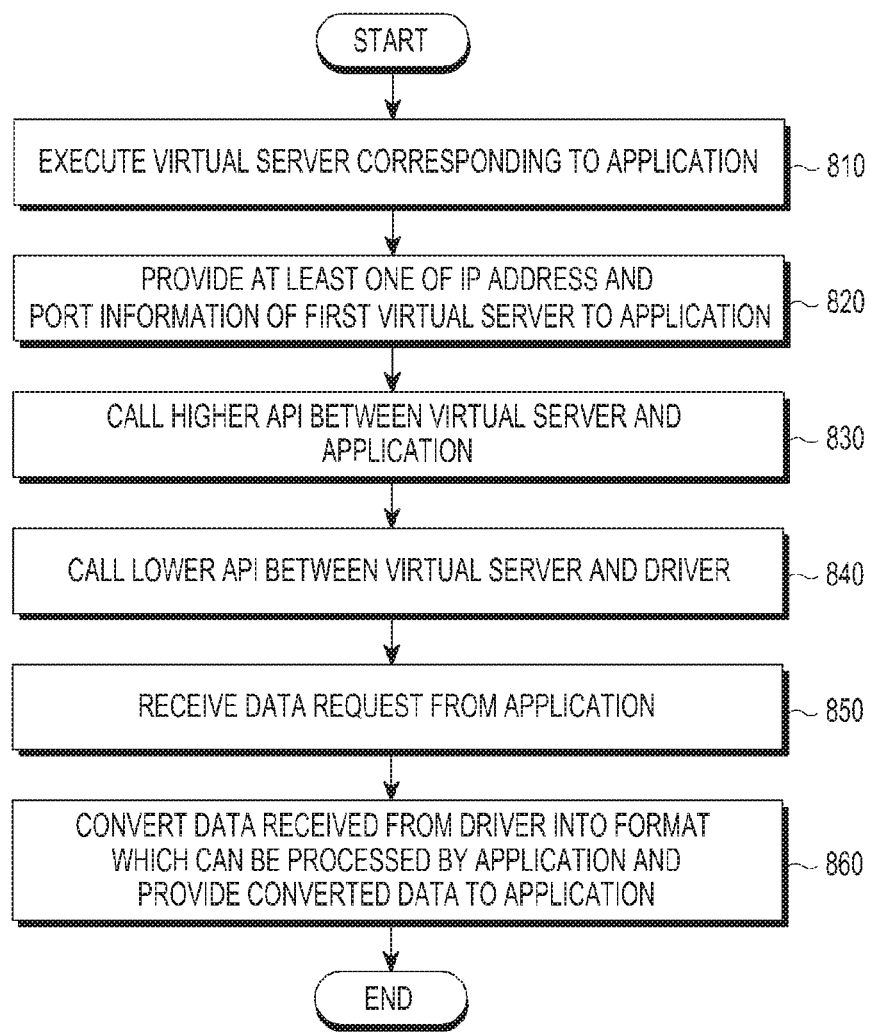
FIG. 8 is a flowchart illustrating a method of controlling the electronic device according to various embodiments of the present disclosure.

FIG. 8 is a flowchart illustrating a method of controlling the electronic device according to various embodiments of the present disclosure.

In step 810, the electronic device 101 may execute a virtual server corresponding to an application. In step 820, the electronic device 101 may provide at least one of an IP address and port information of the first virtual server to the application. As described above, the electronic device 101 may allocate the IP address and the port number of the first virtual server, and provide the allocated information to the corresponding application. Accordingly, the application may transmit a request to the received IP address and port number.

In step 830, the electronic device 101 may call a higher API between the virtual server and the application. In step 840, the electronic device 101 may call a lower API between the virtual server and the driver. In step 850, the electronic device 101 may receive a data request from the application. As described above, the application may make a request for data based on the received IP address and port information of the virtual server. In step 860, the electronic device 101 may convert the data received from the driver to a format that can be processed by the application, and provide the converted data to the application. The electronic device 101 may covert the data request from the higher API to a format suitable for the lower API, and transmit the converted data request to the camera through the driver. The camera having received the data request may transmit the requested data to the virtual server through the driver. The virtual server may convert data from the lower API to a format suitable for the application, and provide the converted data to the application. Meanwhile, the virtual server may process the data requested by the application, for example, stitch a plurality of images, convert a result of the processing, and provide the converted result to the application.

Figure 9:
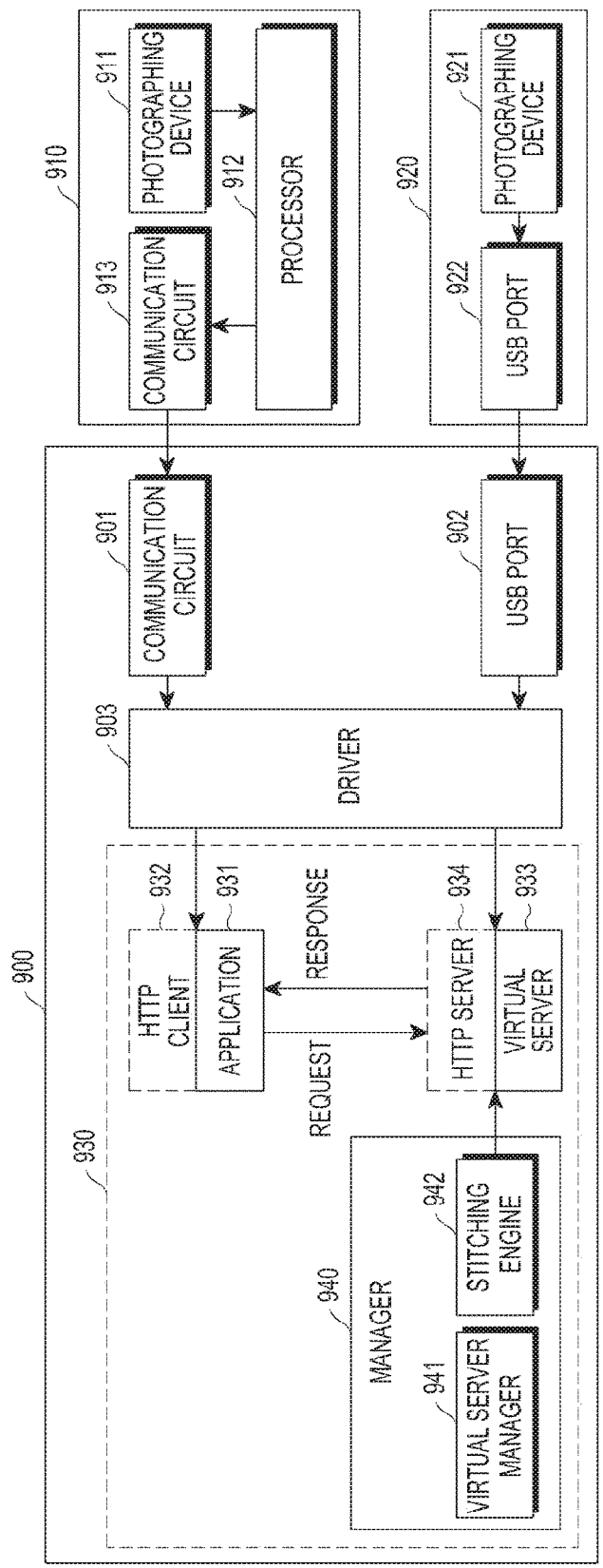
FIG. 9 is a block diagram illustrating the electronic device and the camera according to various embodiments of the present disclosure.

FIG. 9 is a block diagram illustrating an electronic device and a camera according to various embodiments of the present disclosure.

An electronic device 900 may include a communication circuit 901, a USB port 902, and a driver 903. Meanwhile, the electronic device 900 may load a manager 940, an application 931, and a virtual server 933 on a RAM 930. A first camera 910 may include a photographing device 911, a processor 912, and a communication circuit 913. A second camera 920 may include a photographing device 921 and a USB port 922.

The first camera 910 may support an HTTP stack, and the processor 912 may stitch a plurality of images acquired from the photographing device 911 into one wide angle image. The first camera 910 may include the communication circuit 913 for Internet communication. The electronic device 900 or a processor included in the electronic device 900 may acquire identification information of the first camera 910 through the communication circuit 901. The electronic device 900 may identify that the first camera 910 supports the HTTP stack and processes the images in the format requested by the application 931.

When the electronic device 900 determines that the first camera 910 has a capability to transmit data requested by the application, the electronic device 900 may provide data received from the first camera 910 to the application 931 without intervention of the virtual server. Data through the communication circuit 913 may be provided to the driver 903 through the communication circuit 901 of the electronic device 900, and data through the driver 903 may be provided to the application 931. When the first camera 910 stores and executes the HTTP stack and the application 931 operates as an HTTP client 932, the first camera 910 may operate as an HTTP server. Accordingly, the application 931 may directly transmit a data request to the first camera 910, and the first camera 910 may transmit data in response to the received data request.

The above description is only an example, and the electronic device 900 according to various embodiments of the present disclosure may execute the virtual server even when the first camera 910 stores the HTTP stack. In this case, the application 931 may make a request for data to the executed virtual server corresponding to the first camera 910, and the virtual server may transmit the data request to the first camera 910. Then, the first camera 910 may transmit images to the virtual server, and the virtual server may process the received image and provide a processing result to the application 931 as a response.

The second camera 920 may not support the HTTP stack. The electronic device 900 may be connected to the second camera 920 through a USB cable connected between the USB port 902 and the USB port 922. The electronic device 900 may receive identification information of the second camera 920 through, for example, a data line of the USB cable. The electronic device 900 may execute the virtual server 933 corresponding to at least one of the identification information of the second camera 920 and the application 931. For example, a virtual server manager 941 defined in a manager 940 may execute the virtual server 933 corresponding to at least one of the identification information of the second camera 920 and the application 931. Meanwhile, a stitching engine 942 may be defined in the manager 940.

The virtual server 933 may receive the data request from the application 931. The virtual server 933 may covert the data request in the higher API into the lower API and may transmit the converted data request to the second camera 920. The second camera 920 may transmit images acquired according to the data request to the electronic device 900. The virtual server 933 may acquire images received from the second camera 920 through the USB port 902. As described above, the IP address and the port number may be allocated to the virtual server 933, and accordingly, the virtual server 933 may operate as the HTTP server 934. The virtual server 933 may stitch a plurality of images acquired from the second camera 920 into one wide angle image based on, for example, a stitching library called from the stitching engine 942. The virtual server 933 may transmit the processed image to the application 931 as a response.

As described above, the electronic device 900 according to various embodiments of the present disclosure may connect all cameras, including those that support the HTTP stack and those that do not support the HTTP stack, through one platform. Accordingly, even when a third party-manufactured application or a third party-manufactured camera is executed or connected, the electronic device 900 has only to simply store and execute the virtual server corresponding to the application and the camera, and therefore, high compatibility can be guaranteed.

Figure 10:
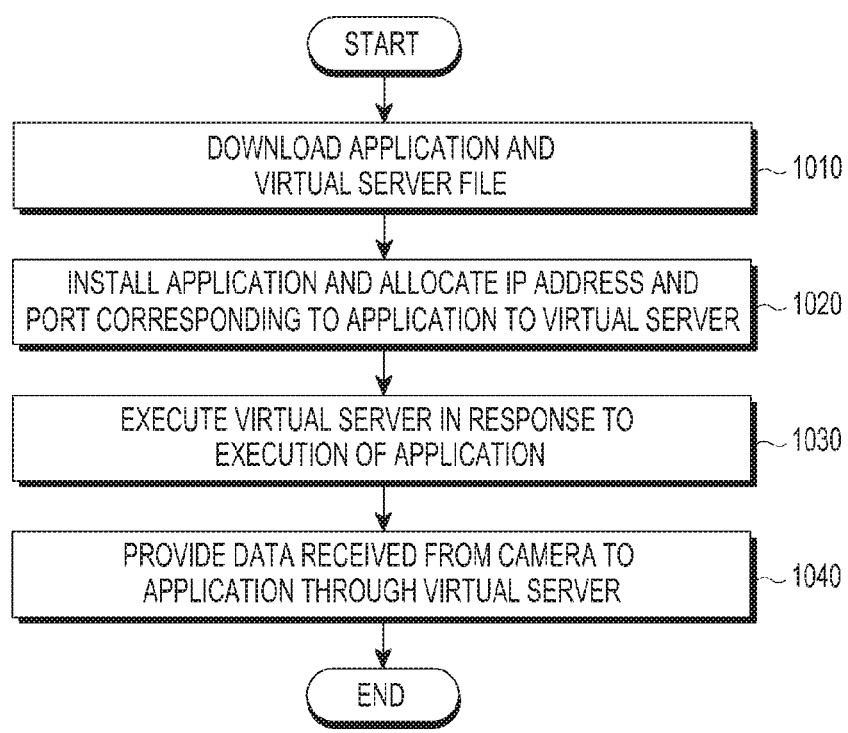
FIG. 10 is a flowchart illustrating a method of controlling the electronic device according to various embodiments of the present disclosure.

FIG. 10 is a flowchart illustrating a method of controlling the electronic device according to various embodiments of the present disclosure.

In step 1010, the electronic device 101 may download an application and a virtual server file. The virtual server file may be included in the application. The virtual server file may be created for each application in advance and may include a virtual server manager. For example, the virtual server file may define a higher API and lower API. Alternatively, the virtual server file may include an engine, which can process an image, or a function for loading an image processing library from the engine, which can process the image. In this case, the virtual server manager may be implemented to be included in, for example, the application, and an embodiment therefor will be described in more detail with reference to FIG. 14.

In step 1020, the electronic device 101 may install the application, and allocate an IP address and a port corresponding to the application to the virtual server. According to various embodiments of the present disclosure, the electronic device 101 may allocate different IP addresses and ports to a plurality of virtual servers corresponding to a plurality of applications, respectively. The electronic device 101 may allocate different IP addresses and ports according to the identification information from connected cameras. As described above, even though virtual servers correspond to the same application, the electronic device 101 may generate different virtual servers for different cameras. Accordingly, the electronic device 101 may allocate different IP addresses and ports to respective virtual servers corresponding to respective connected cameras. That is, the electronic device 101 may allocate IP addresses and ports to virtual servers corresponding to at least one of the applications and the identification information of the connected cameras.

In step 1030, the electronic device 101 may execute the virtual server in response to the execution of the application. In step 1040, the electronic device 101 may provide data received from the camera to the application through the virtual server. As described above, the electronic device 101 may transmit a request from the application to the IP address and the port number of the virtual server based on an HTTP client-server type. The virtual server may transmit the received request to the camera through the lower API, and the camera may transmit a response corresponding to a received call to the virtual server. The virtual server may transmit the received response to the application through the higher API.

According to various embodiments of the present disclosure, the electronic device 101 may download only the application and generate the virtual server file corresponding to the downloaded application. That is, the virtual server file may not be included in a download package. In this case, the virtual server manager may be implemented at, for example, a framework level, and an embodiment therefor will be described in more detail with reference to FIG. 15.

The application may be created to define an API and an engine to load a library. For example, the virtual server manager of the electronic device 101, which has been already installed at the framework level, may generate the virtual server, and allocate the IP address and the port number in response to the detection of a virtual server execution event. Further, the electronic device 101 may control the virtual server to call the API used by the application or to load the library of the function required by the application.

Figure 11:
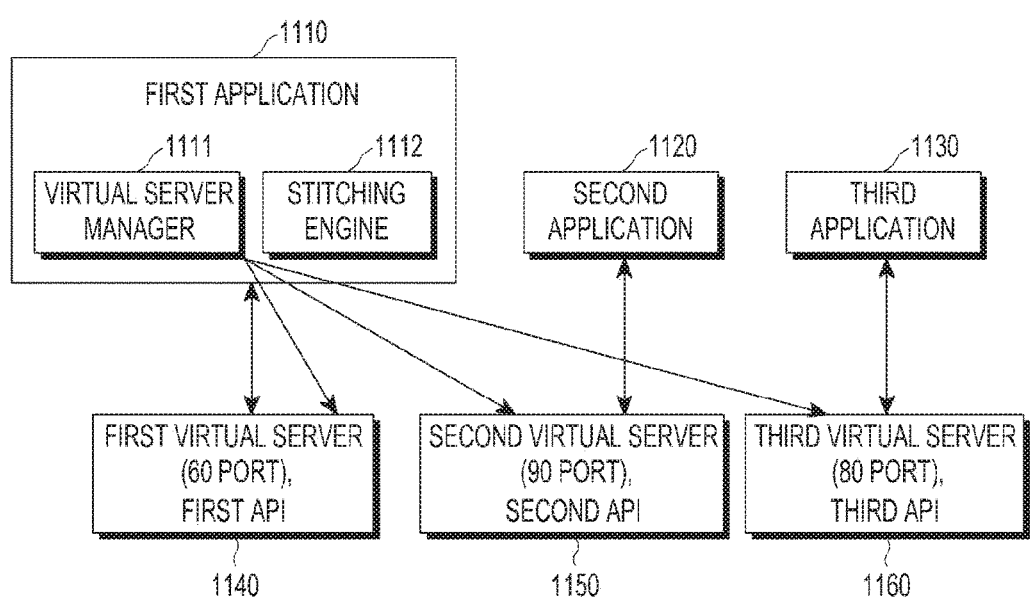
FIG. 11 is a conceptual diagram illustrating allocation of an IP address and a port number of the virtual server according to various embodiments of the present disclosure.

FIG. 11 is a conceptual diagram illustrating allocation of an IP address and a port number of the virtual server according to various embodiments of the present disclosure.

The electronic device 101 may install a first application 1110 within the electronic device 101. The first application 1110 may include a stitching engine 1112 and also a virtual server manager 1111. Further, the first application 1110 may transmit a request to a first virtual server 1140, and receive a response corresponding to the request from the first virtual server 1140. That is, the first application 1110 may provide not only a function for processing an image but also a function for generating, executing, and managing the virtual server. The virtual server manager 1111 may install or generate virtual servers 1140, 1150, and 1160 corresponding to installed respective applications 1110, 1120, and 1130. Further, when a connection of the camera is detected, the virtual server manager 1111 may execute the virtual servers 1140, 1150, and 1160. Alternatively, the virtual server manager 1111 may execute the virtual server corresponding to the executed application. For example, when the second application 1120 is executed, the virtual server manager 1111 may execute the second virtual server 1150 corresponding to the second application 1120. The virtual server manager 1111 may allocate different IP addresses and port numbers to the virtual servers 1140, 1150, and 1160. The virtual servers 1140, 1150, and 1160 may call different APIs such as a first API, a second API, and a third API.

Figure 12:
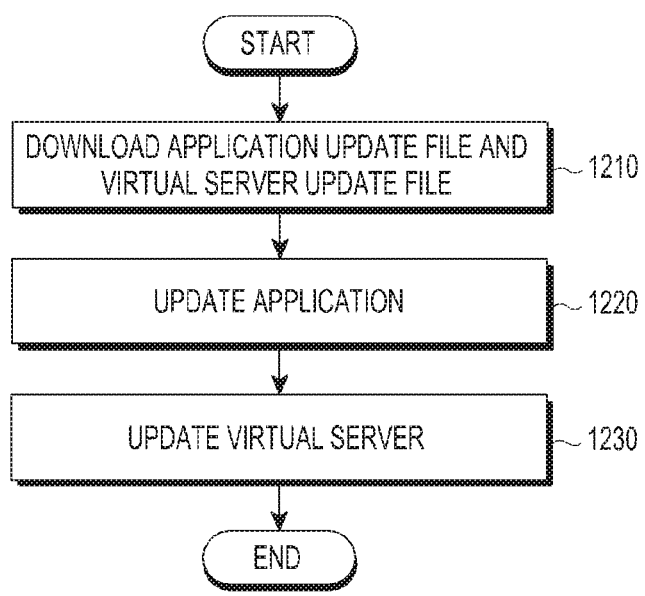
FIG. 12 is a flowchart illustrating a method of controlling the electronic device according to various embodiments of the present disclosure.

FIG. 12 is a flowchart illustrating a method of controlling the electronic device according to various embodiments of the present disclosure.

In step 1210, the electronic device 101 may download an application update file and a virtual server update file. In step 1220, the electronic device 101 may update the application. In step 1230, the electronic device 101 may update the virtual server. As described above, the electronic device 101 updates only the virtual server installed in the electronic device 101 and does not need to update the software within the camera. Particularly, since the electronic device 101 can actually update the application and the virtual server at the same time, there is no inconvenience due to separate updates of the application and firmware for different hardware.

According to another embodiment of the present disclosure, the electronic device 101 may download only the application update file. In this case, the application update file may include virtual server update information, and the electronic device 101 may update the virtual server based on virtual server update information. The virtual server update information may contain at least one piece of information on a change in the defined API and information on a change in the engine to load the library.

Figure 13:
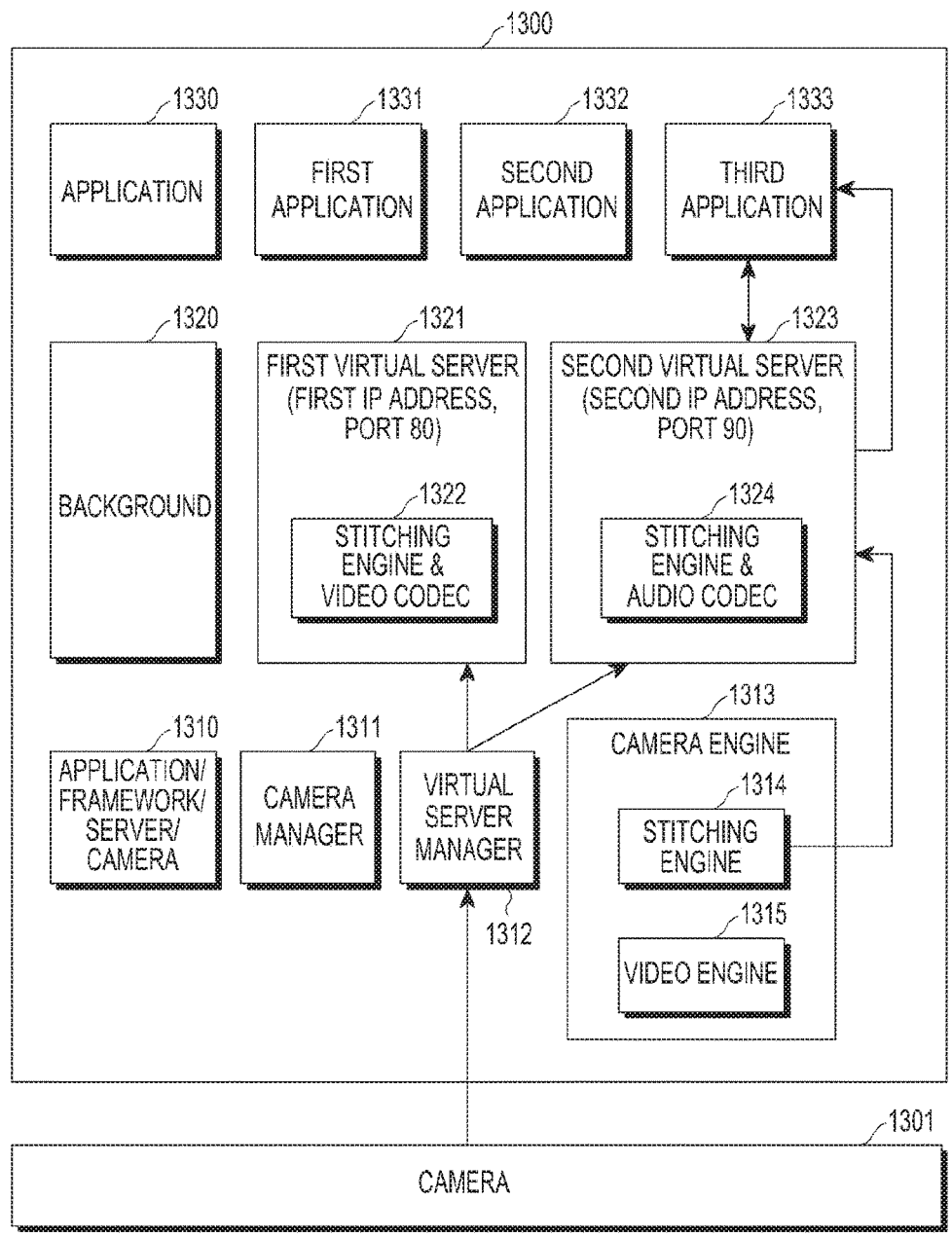
FIG. 13 is a conceptual diagram illustrating the operation of the virtual server according to various embodiments of the present disclosure.

FIG. 13 is a conceptual diagram illustrating the operation of a virtual server according to various embodiments of the present disclosure.

In an application layer or a framework layer or a server or a camera 1310 of the electronic device 1300, a camera manager 1311, a virtual server manager 1312, and a camera engine 1313 may be defined. Particularly, the virtual server manager 1312 may be defined in various layers or various hardware such as the application layer, the framework layer, the server, or the camera 1310, which will be described in more detail with reference to FIGS. 14 to 17. The camera manager 1311 may manage the connection of the camera. The camera engine 1313 may provide data, for example, a library for processing an image or a video file from the camera. The camera engine 1313 may include a stitching engine 1314 for providing a library that stitches a plurality of images into one image, and a video engine 1315 for providing a function that processes a video file. The virtual server manager 1312 may execute virtual servers 1321 and 1323 corresponding to identification information of a camera 1301 in response to the connection of the camera 1301.

The first virtual server 1321 may receive, for example, a first IP address and a port number "80", and may include a stitching engine and video codec 1322, or load a library from a stitching engine 1314 and a video codec 1315. The second virtual server 1323 may receive, for example, a second IP address and a port number "90", and may include a switching engine and image codec 1324, or load a library from the stitching engine 1314 and an image codec. According to various embodiments of the present disclosure, the virtual servers 1321 and 1323 may be set independently according to the type of data from the camera 1301. For example, when the data received from the camera 1301 is a video, the first virtual server 1321 may receive the video data from the camera 1301 and process the received video data. For example, the first virtual server 1321 may code or decode the video based on the library loaded from the video codec. When the data received from the camera 1301 is an image, the second virtual server 1323 may receive the image data from the camera 1301 and process the received image data.

For example, the second virtual server 1323 may code or decode the image based on the library loaded from the image codec. The second virtual server 1323 may receive a request from the third application 1333 and provide processed data to the third application 1333 in response to the received request.

The virtual servers 1321 and 1323 may operate in the background 1320. As the applications 1331 to 1333 are displayed on a display of the electronic device 1300 through the execution on the application layer 1330 and the operation in the foreground, the virtual servers 1321 and 1323 may be executed in the background 1320 without being displayed on the display of the electronic device 1300. That is, the background 1320 may refer to a space in which the virtual servers are executed without being output by various output devices of the electronic device 1300.

As described above, the virtual server may be set independently according to the type of data from the camera.

FIGS. 14 to 17 are conceptual diagrams illustrating various execution locations of the virtual server according to various embodiments of the present disclosure.

Figure 14:
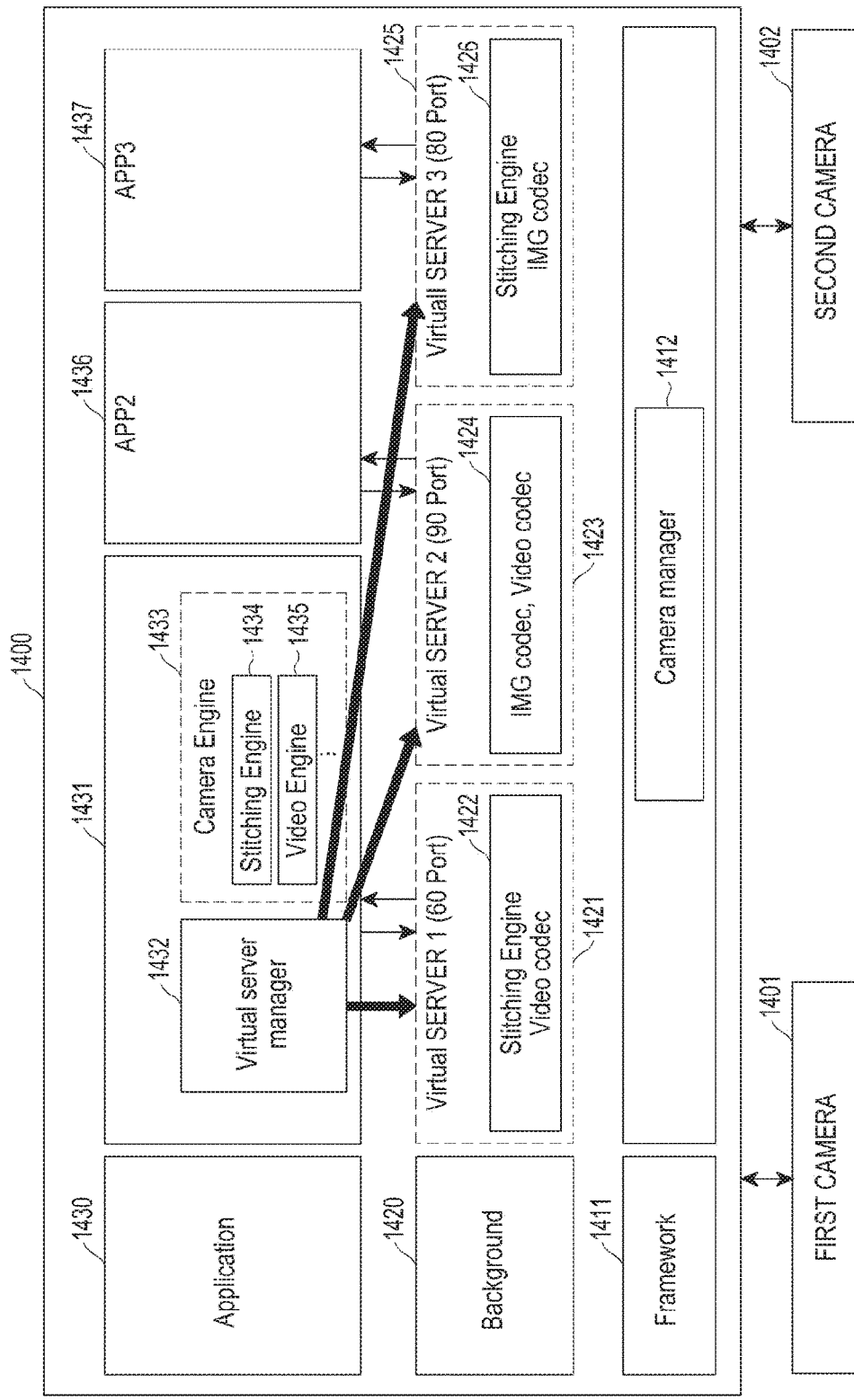
FIGS. 14 to 17 are conceptual diagrams illustrating various execution locations of the virtual server according to various embodiments of the present disclosure.

As shown in FIG. 14, an electronic device 1400 may be connected to a first camera 1401 and a second camera 1402. On a framework layer 1411 of the electronic device 1400, a camera manager 1412 may be defined. The camera manager 1412 may manage the connections of cameras 1401 and 1402. In a background 1420, various virtual servers 1421, 1423, and 1425 may be executed. The virtual server may be referred to as an API server in that the virtual server calls and uses an API between an application and the virtual server, and an API between the virtual server and a lower layer such as a driver. Alternatively, the virtual server may be referred to as a web server in that the virtual server receives an IP address and a port number.

Different IP addresses and port numbers may be allocated to the respective virtual servers 1421, 1423, and 1425. The virtual servers 1421, 1423, and 1425 may include various engines 1422, 1424, and 1426, and each of the virtual servers 1421, 1423, and 1425 may be executed or generated by a virtual server manager 1432 included within a first application 1431. The first application 1431 may be executed on the application layer 1430, and may include a camera engine 1433 including a stitching engine 1434 and a video engine 1435. The virtual server manager 1431 may be included within one application of the application layer 1430, for example, the first application 1431. In this case, in order to execute the second virtual server 1423 or the third virtual server 1425, the execution of the first application 1431 has to be preceded. That is, in order to make the second application 1436 or the third application 1437 receive data from the second virtual server 1423 or the third virtual server 1425, the execution of the first application 1431 has to be preceded. Including the virtual server manager 1431 in the application may have an advantage in that data can be provided by the virtual servers 1421, 1423, and 1425 without modification of the framework 1411.

Figure 15:
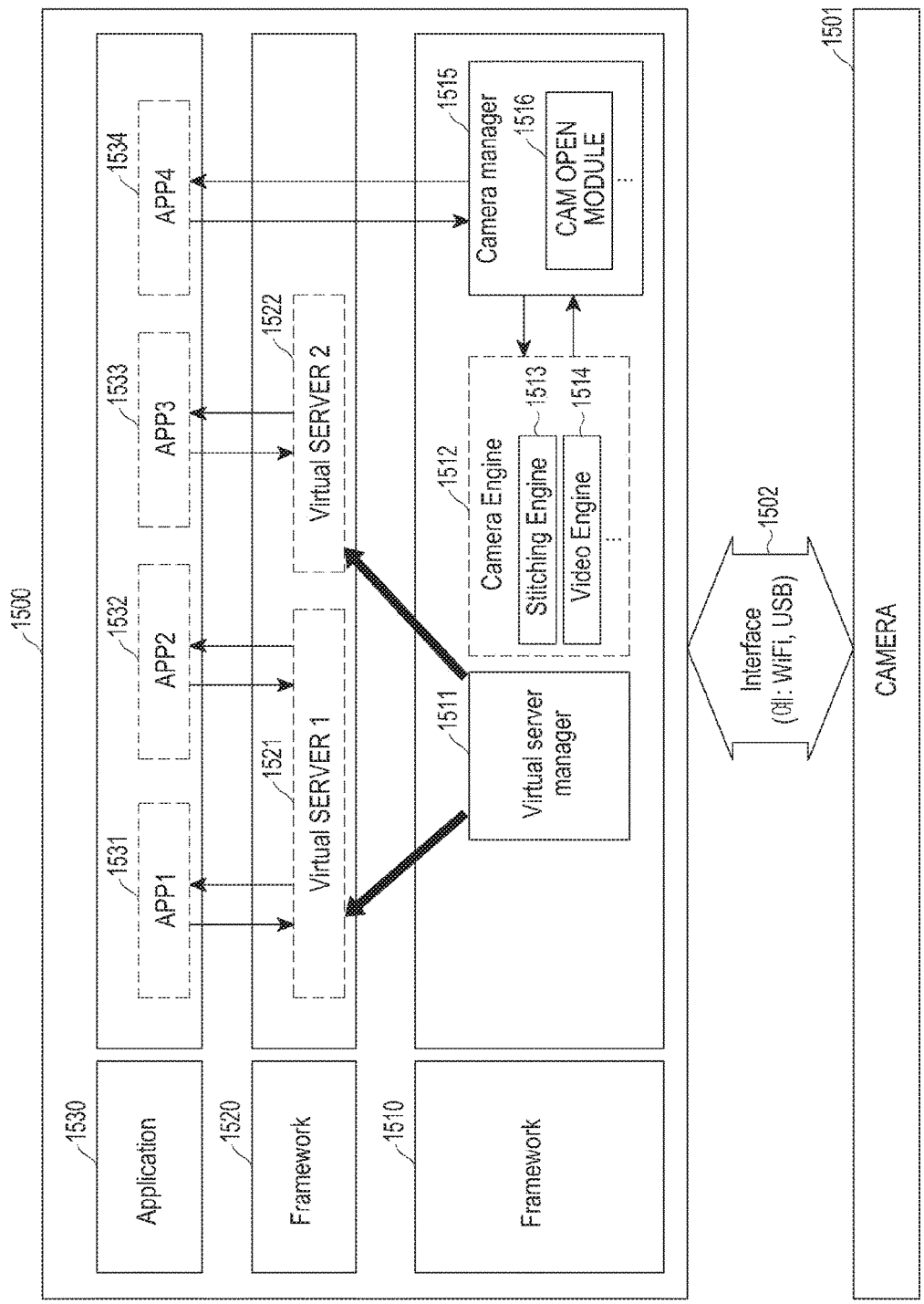

FIG. 15 illustrates the case in which a virtual server manager 1511 is installed on a framework layer 1510 according to various embodiments of the present disclosure.

An electronic device 1500 may install and execute the virtual server manager 1511 on the framework layer 1510. Further, a camera engine 1512, including a stitching engine 1513 and a video engine 1514, may be defined on the framework layer 1510, and may interact with a camera manager 1515. The camera manager 1515 may manage the connection to a camera 1501 through an interface 1502 (e.g., Wi-Fi or USB), and may include, for example, a camera open module 1516 (CAM open module). The camera open module 1516 may control camera initiation.

According to another embodiment of the present disclosure, the camera manager 1515 may load various libraries from the camera engine 1512 and process an image from the camera 1501. For example, when a fourth application 1534 that does not support the HTTP client-server type is executed, the electronic device 1500 may directly provide the image processed by the camera manager 1515 to a fourth application 1534 without passing through the virtual server. Virtual servers 1521 and 1522 may be executed in the background 1520 or generated by the virtual server manager 1511. Applications 1531 to 1533, which support the HTTP client-server type, executed on the application layer 1530 may transmit a request to the virtual servers 1521 and 1522, and receive a response corresponding to the transmitted request from the virtual servers 1521 and 1522.

Figure 16:
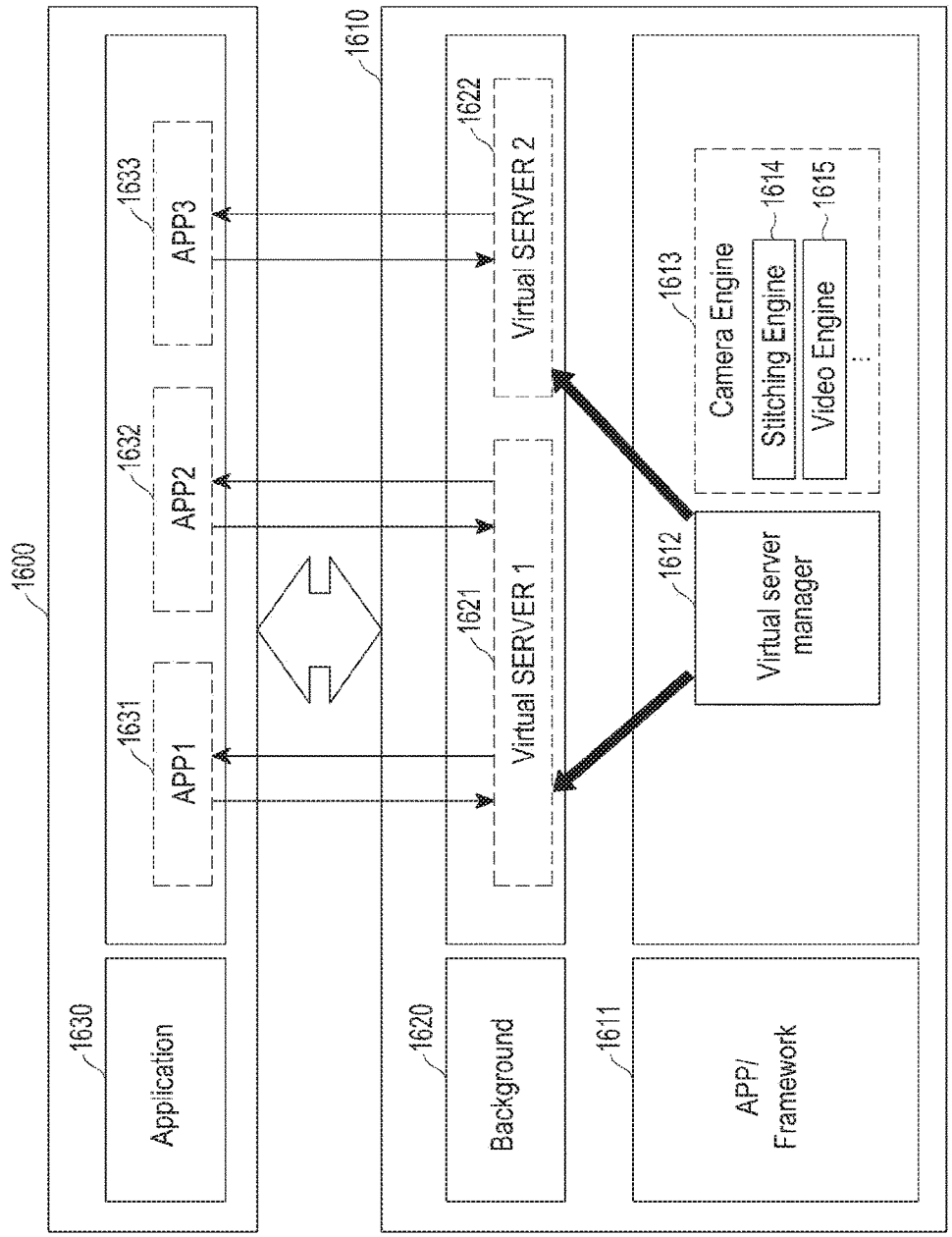

FIG. 16 illustrates the case in which a virtual server manager 1612 is included in a camera 1610 according to various embodiments of the present disclosure.

On an application layer or a framework layer 1611 of the camera 1610, a virtual server manager 1612 and a camera engine 1613 may be defined. The camera engine 1613 may include a stitching engine 1614 and a video engine 1615 for providing a library required for processing an image. The virtual server manager 1612 may execute or generate virtual servers 1621 and 1622 in the background 1620. The virtual servers 1621 and 1622 may receive a request from applications 1631 to 1633 executed on an application layer 1630 of the electronic device 1600. The virtual servers 1621 and 1622 may process the image corresponding to the request based on the library loaded from the camera engine 1613, and provide the processed image to the applications 1631 to 1633 in response to the request.

Figure 17:
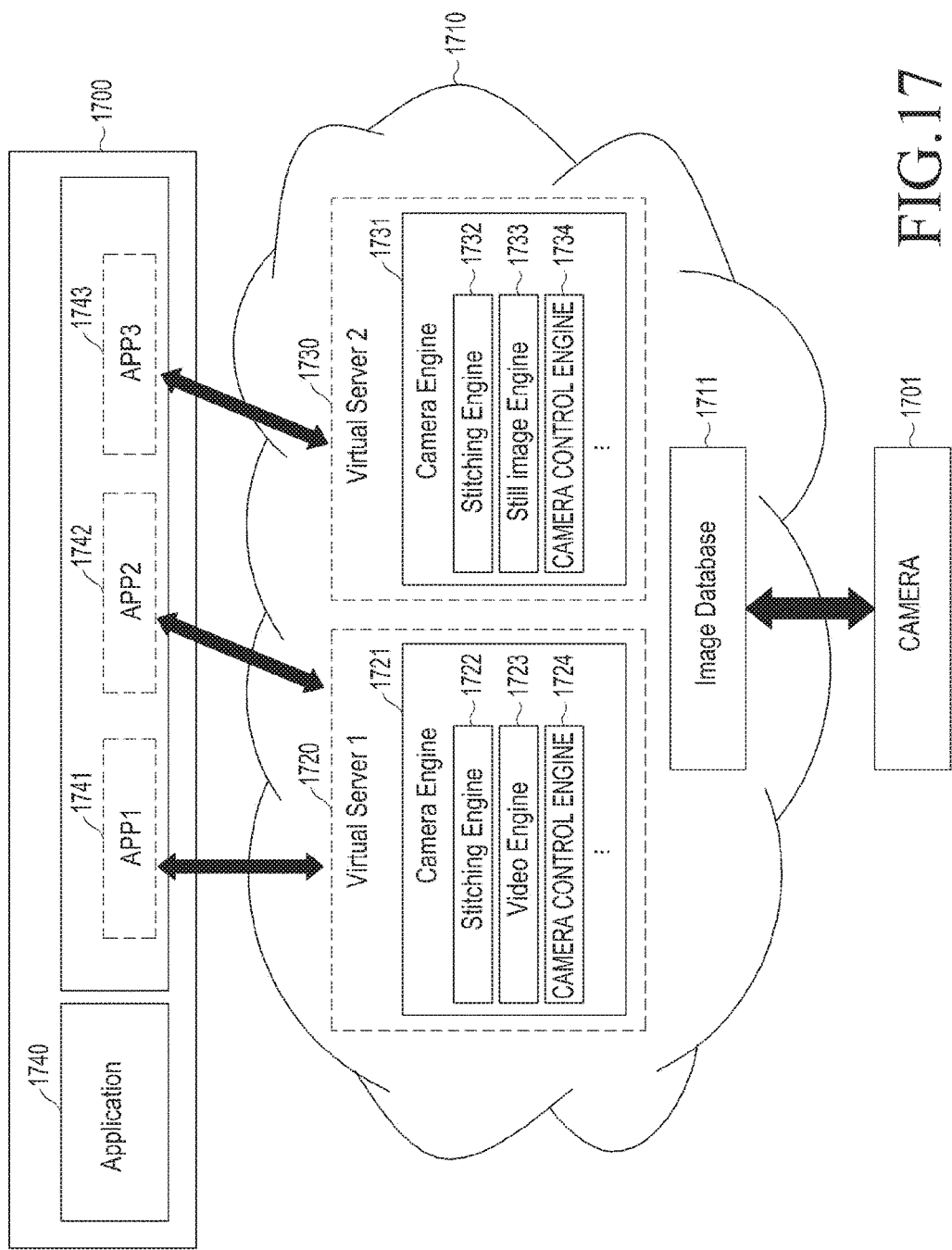

FIG. 17 illustrates the case in which virtual servers 1720 and 1730 are executed in an external server 1710 according to various embodiments of the present disclosure.

On an application layer 1740 of an electronic device 1700, applications 1741 to 1743 may be executed. In the external server 1710, the virtual servers 1720 and 1730 may be always executed. The external server 1710 may include a relatively high-performance processor and a relatively high-capacity memory, and thus always execute the virtual servers 1720 and 1730. According to another embodiment of the present disclosure, the external server 1710 may also include a virtual server manager, and the virtual server manager may execute a specific virtual server in response to a request received from the outside. The virtual servers 1720 and 1730 may include camera engines 1721 and 1731, and the camera engine 1721 may include a stitching engine 1722, a video engine 1723, and a camera control engine 1724. The camera engine 1731 may include a stitching engine 1732, a still image engine 1733, and a camera control engine 1734. The camera control engine 1724 may provide a library for controlling a camera 1701. An image database 1711 may store an image received from the camera 1701. The image may be processed using libraries provided from various engines included in the virtual server. When receiving a request from applications 1741 to 1743, the external server 1710 may provide a processed image corresponding to the request from the applications 1741 to 1743 as a response. As described above in connection with FIGS. 14 to 17, the virtual server manager or the virtual server may be included in various layers of software and/or various levels of hardware.

Figure 18:
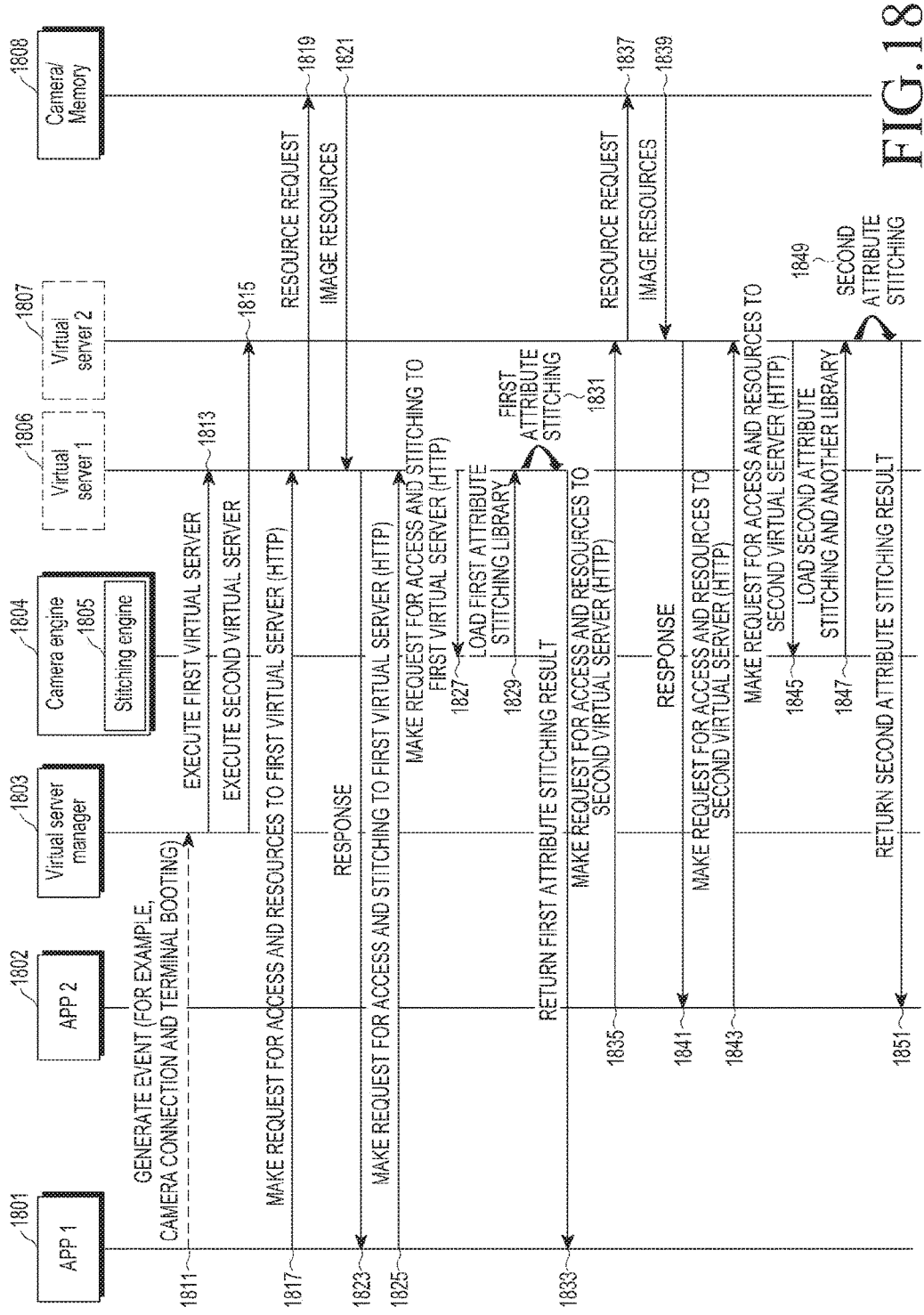
FIG. 18 is a flowchart illustrating the operation of the virtual server according to various embodiments of the present disclosure.

FIG. 18 is a flowchart illustrating the operation of a virtual server according to various embodiments of the present disclosure.

In step 1811, a virtual server manager 1803 may detect the generation of a preset event such as a camera connection or terminal booting. The preset event may be preset to execute or generate the virtual server. The virtual server manager 1803 may execute or generate a first virtual server 1806 and a second virtual server 1807 in response to the event detection in steps 1813 and 1815, respectively. The virtual server manager 1803 may execute or generate all virtual servers corresponding to, for example, identification information of the connected camera. When an application is executed, the virtual server manager 1803 may be set to execute or generate only the virtual server corresponding to the executed application.

A first application 1801 may transmit an access and resource request to a first virtual server 1806 based on the HTTP client-server type. As described above, the first virtual server 1806 may be allocated an IP address and a port number in advance, and although not illustrated, the first application 1801 may receive the IP address and the port number of the first virtual server 1806 in advance. Accordingly, the first application 1801 may transmit the access and resource request to the first virtual server 1806 based on the IP address and the port number of the first virtual server 1806. In step 1817, the first application 1801 may make a request for access and resources to the first virtual server 1806 using HTTP. In step 1819, the first virtual server 1806 may make a request for resources to a camera or a memory 1808 in response to the request received in step 1817. The camera or the memory 1808 may transmit resources, for example, image resources to the first virtual server 1806 in response to the request from the first virtual server 1806 in step 1821. In step 1823, the first virtual server 1806 may transmit a response corresponding to the request to the first application 1801. The transmitted response may contain information indicating that the request for the resources has been successfully processed, and, for example, the response may contain a 200 OK or 201 created code in the HTTP format.

In step 1825, the first application 1801 may transmit a virtual server access and stitching request to the first virtual server 1806. Since the HTTP adopts the scheme in which the connection is released after response-request is completed, the first application 1801 may transmit the access request to the first virtual server 1806 again. The first virtual server 1806 may make a request for loading a first attribute stitching library to a camera engine 1804 including a stitching engine 1805 in step 1827. The stitching attributes may refer to a type in which a plurality of images are stitched. That is, a difference in the stitching attributes may mean a difference in the types in which a plurality of images are stitched into one image. In step 1829, the first virtual server 1806 may load the library. In step 1831, the first virtual server 1806 may perform stitching of the first attributes based on the loaded library. In step 1833, the first virtual server 1806 may provide a result of the stitching of the first attributes, that is, the processed image, to the first application 1801 in response to the request in step 1825.

In step 1835, the second application 1802 may transmit an access and resource request to the second virtual server 1807. In step 1837, the second virtual server 1807 may transmit the resource request to the camera or the memory 1808. In step 1839, the camera or the memory 1808 may transmit resources, for example, image resources to the second virtual server 1807. In step 1841, the second virtual server 1807 may transmit a response to the resource request to the second application. In step 1843, the second application 1802 may transmit the access and stitching request to the second server 1807. In step 1845, the second virtual server 1807 may make a request for performing stitching of the second attributes and loading another library to the camera engine 1804. In step 1847, the second virtual server 1807 may load the second attributes and load another library from the camera engine 1804. In step 1849, the second virtual server 1807 may perform the stitching of the second attributes based on the loaded library. In step 1851, the second virtual server 1807 may transmit a result of the stitching of the second attributes to the second application 1802 in response to the request in step 1843. For example, the first application 1801 and the second application 1802 may be applications using stitched images having different attributes. Accordingly, the virtual servers 1806 and 1807 may also load the first attribute stitching library and the second attribute stitching library from the camera engine 1804, and provide the stitched images in formats requested by the applications 1801 and 1802. Meanwhile, the operation order described in FIG. 18 are only an example, and it may be easily understood by those skilled in the art that the order can be changed. For example, the library may be loaded according to various methods such as static loading or dynamic loading, and accordingly loaded at various time points.

Figure 19:
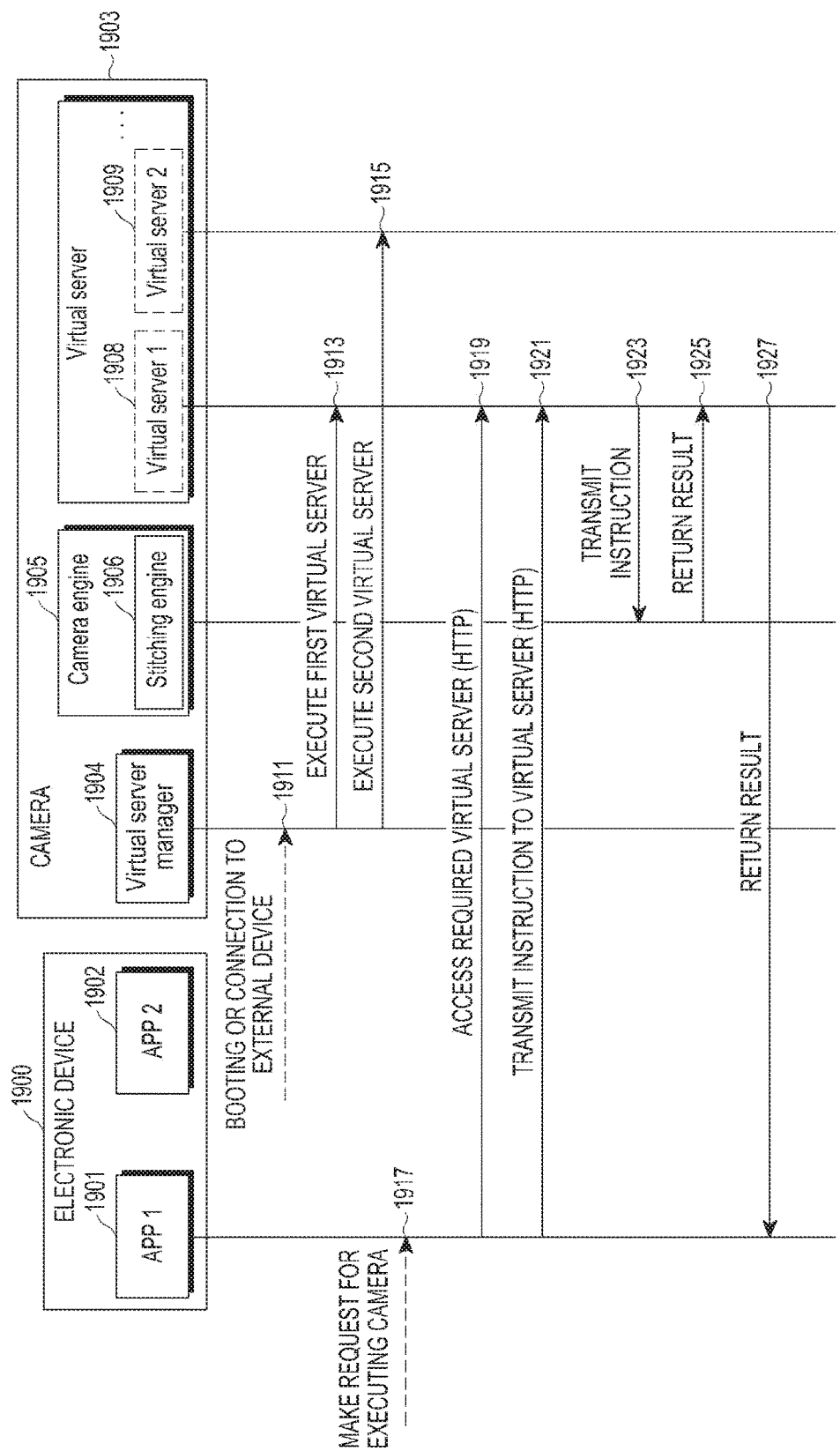
FIG. 19 is a flowchart illustrating the operation in the case in which a virtual server manager is included in the camera according to various embodiments of the present disclosure.

FIG. 19 is a flowchart illustrating the operation in the case in which the virtual server manager is included in the camera according to various embodiments of the present disclosure.

An electronic device 1900 may execute a first application 1901 and a second application 1902. A virtual server manager 1904 of a camera 1903 may detect a virtual server execution condition such as booting of the camera 1903 or a connection to the electronic device 1900 in step 1911. When the virtual server execution condition is detected, the virtual server manager 1904 may generate a first virtual server 1908 and a second virtual server 1909 in steps 1913 and 1915.

A first application 1901 of the electronic device 1900 may receive a camera execution request in step 1917. In step 1919, the first application 1901 may access a required virtual server, for example, the first virtual server 1908. In step 1921, the first application 1901 may transmit an instruction to the virtual server. For example, after the camera 1903 is connected to the electronic device 1900, the camera 1903 may provide IP addresses and port numbers of the virtual servers 1908 and 1909 to the electronic device 1900. The first application 1901 may perform the access and instruction transmission in steps 1919 and 1921 based on the received IP addresses and port numbers of the virtual servers 1908 and 1909.

In step 1923, the first virtual server 1908 may transmit an instruction to the camera engine 1905 including a stitching engine 1906 in response to the received instruction. In step 1925, the camera engine 1905 may process the image corresponding to the instruction and return a result of the processing to the first virtual server 1908. In step 1927, the first virtual server 1908 may transmit the result to the first application 1901.

Figure 20:
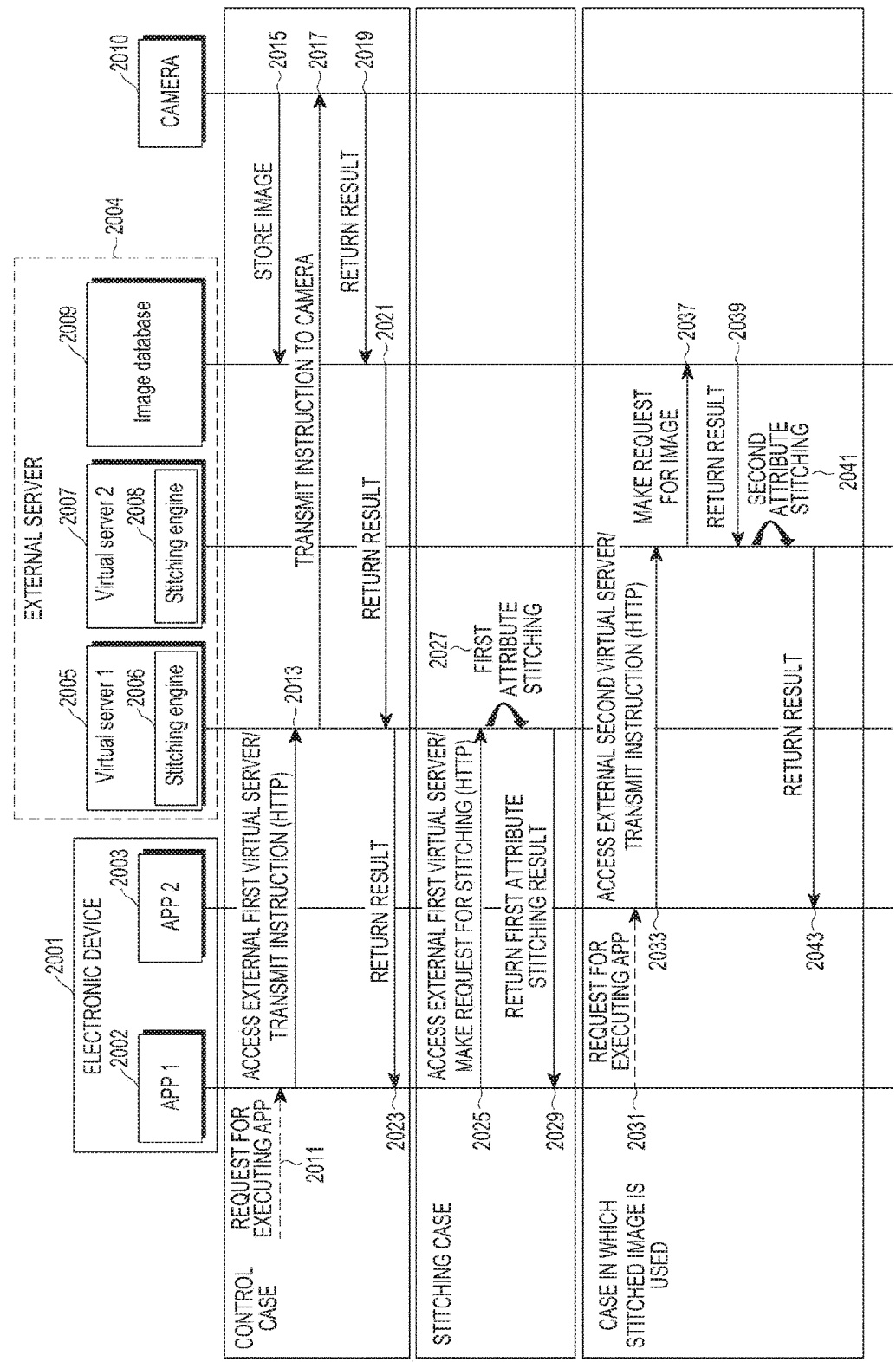
FIG. 20 is a flowchart illustrating the operation in the case in which the virtual server is included in an external server according to various embodiments of the present disclosure.

FIG. 20 is a flowchart illustrating the operation in the case in which the virtual server is included in an external server according to various embodiments of the present disclosure.

An electronic device 2001 may store a first application 2002 and a second application 2003. In step 2011, the first application 2002 may be executed in response to an application execution request. In step 2013, the first application 2002 may access a first virtual server 2005 and transmit an instruction to the first virtual server 2005 executed in an external server 2004. The first application 2002 may receive an IP address and a port number of the first virtual server 2005 in advance, and perform the access and the instruction transmission based on the IP address and the port number. The first virtual server 2005 may include, for example, a stitching engine 2006. An image database 2009 of the external server 2004 may store an image received from a camera 2010 in step 2015. In step 2017, the first virtual server 2005 may transmit the instruction to the camera 2010. The camera 2010 may return a result corresponding to the instruction in step 2019. The image database 2009 may store the returned result and transmit it to the first virtual server 2005 in step 2021. The first virtual server 2005 may return a result corresponding to the request in step 2023 to the first application 2002. As described above, the electronic device 2001 may control the camera 2010 through the external server 2004.

For a stitching process, the first application 2002 may transmit an access and stitching request to the first virtual server 2005 in step 2025. The first virtual server 2005 may load a stitching library from the stitching engine 2006 included therein, and perform first attribute stitching in step 2027. In step 2029, the first virtual server 2005 may return a result of the first attribute stitching in response to the request in step 2025.

In order to use the stitched image, the first application 2002 may make a request for executing a second application 2003 in step 2031. When the second application 2003 is executed, the second application 2003 may transmit a request for accessing the second virtual server 2007 and transmitting an instruction to the second virtual server 2007 in step 2033. The second virtual server 2007 may include, for example, the stitching engine 2008. The second virtual server 2007 may make a request for an image to an image database in step 2037, and receive a result in step 2039. The second virtual server 2007 may perform stitching of second attributes based on a library from the stitching engine 2008 included therein in step 2041. The stitching method in step 2041 may be different from the stitching method in step 2027. In step 2043, the virtual server 2007 may return the stitching result to the second application 2003.

A method of controlling an electronic device according to various embodiments of the present disclosure includes an operation of executing a virtual server when a connection of a camera to the electronic device is detected, an operation of identifying an application using at least one image from the camera or identifying an execution of the application in an external electronic device, an operation of receiving at least one image from the camera and processing at least one image through the virtual server, and an operation of providing at least one image processed through the virtual server to the application.

The virtual server according to various embodiments of the present disclosure may be configured to correspond to at least one of identification information of the camera, the application, and types of at least one image from the camera.

The method of controlling the electronic device according to various embodiments of the present disclosure may further include an operation of allocating an (IP address and a port number of the virtual server.

The method of controlling the electronic device according to various embodiments of the present disclosure may further include an operation of providing a request from the application to the virtual server based on the IP address and the port number of the virtual server.

The operation of providing at least one image processed through the virtual server to the application according to various embodiments of the present disclosure may include an operation of providing at least one image processed through the virtual server to the application in response to the request from the application.

The provision of the request and the response according to various embodiments of the present disclosure may be performed based on a HTTP client-server type.

The operation of providing the request from the application to the virtual server based on the IP address and the port number of the virtual server according to various embodiments of the present disclosure may include an operation of providing the request to the virtual server through higher API between the virtual server and the application, and an operation of providing the request to the camera through a lower API between the virtual server and a lower level of the virtual server.

The operation of providing at least one image processed through the virtual server to the application according to various embodiments of the present disclosure may include an operation of receiving at least one image from the camera through a lower API between the virtual server and a lower level of the virtual server, and an operation of providing at least one processed image to the application as the response based on a higher API between the virtual server and the application.

The operation of providing at least one image processed through the virtual server to the application according to various embodiments of the present disclosure may include an operation of converting the response in a format that can be processed by the application and providing the converted response to the application.

The operation of processing at least one image through the virtual server according to various embodiments of the present disclosure may include an operation of loading a library corresponding to a processing function from an engine for processing at least one image and an operation of processing at least one image based on the loaded library.

The operation of processing at least one image through the virtual server according to various embodiments of the present disclosure may include an operation of stitching at least one image into one image.

A method of controlling a camera according to various embodiments of the present disclosure includes an operation of acquiring a plurality of images, an operation of detecting a connection of the camera to an external electronic device, an operation of detecting an execution of an application using an image stitched from the plurality of images in the external electronic device, an operation of executing a virtual server corresponding to the application in the memory, an operation of controlling stitching of the plurality of images into one stitched image, and an operation of providing the stitched image to the application of the external electronic device through the virtual server.

A method of controlling a server according to various embodiments of the present disclosure includes an operation of executing a virtual server when a communication circuit receives a request for a processed image from an application executed by an electronic device, an operation of processing at least one image through the virtual server when at least one image is received from a camera, and an operation of providing the processed image to the application executed by the electronic device from the virtual server.

According to various embodiments of the present disclosure, a storage medium having instructions stored therein is provided. The instructions may be configured to cause at least one processor, when executed by at least one processor, to perform at least one operation. The at least one operation includes an operation of, when a connection of a camera to the electronic device is detected, executing a virtual server; an operation of executing an application using at least one image from the camera or detecting the execution of the application in an external electronic device; an operation of receiving at least one image from the camera and processing at least one image through the virtual server; and an operation of providing at least one image processed through the virtual server to the application.

Various embodiments of the present disclosure provide an electronic device capable of executing virtual servers corresponding to an application and a camera so as to process images according to requests from various applications and provide the processed images to the applications, and a method of controlling the same. Accordingly, even though images are received from relatively low-performance cameras, the images can be processed according to the need of applications requesting the images and then provided to the applications. As a result, it is not required to manufacture cameras according to the need of applications and thus it is possible to induce industrial participation of various third parties. Further, the images can be processed by adding only virtual servers corresponding to respective applications, and accordingly, all of various types of applications can be processed by one electronic device. Even when a particular application is updated, an electronic device storing a virtual server can be updated alone, so that an update process can be simplified.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure as defined in the appended claims and their equivalents.

What is claimed is:

1. An electronic device comprising:
a memory; and
a processor,
wherein the memory stores instructions to which when executed, cause the processor to load a virtual server in the memory when a connection of a camera to the electronic device is detected, receive at least one image from the camera, control processing of the at least one image through the virtual server, and provide the at least one image processed through the virtual server to an application corresponding to the virtual server.

2. The electronic device of claim 1, wherein the virtual server is configured to correspond to at least one of identification information of the camera, the application, and types of at least one image from the camera.

3. The electronic device of claim 1, wherein the memory stores instructions which when executed, cause the processor to allocate an Internet protocol (IP) address and a port number to the virtual server.

4. The electronic device of claim 3, wherein the memory stores instructions which when executed, cause the processor to provide a request from the application to the virtual server based on the IP address and the port number of the virtual server.

5. The electronic device of claim 4, wherein the memory stores instructions which when executed, cause the processor to provide the at least one image processed through the virtual server to the application in response to the request from the application.

6. The electronic device of claim 5, wherein the request and the response are performed based on a hypertext transfer protocol (HTTP) client-server type.

7. The electronic device of claim 4, wherein the memory stores instructions which when executed, cause the processor to provide the request to the virtual server through a higher application programming interface (API) between the virtual server and the application, and to provide the request to the camera through a lower API between the virtual server and a lower level of the virtual server.

8. The electronic device of claim 5, wherein the memory further stores instructions which when executed, cause the processor to receive the at least one image from the camera through a lower API between the virtual server and a lower level of the virtual server and to provide the at least one processed image to the application as the response based on a higher API between the virtual server and the application.

9. The electronic device of claim 8, wherein the memory stores instructions which when executed, cause the processor to convert the response to a format that can be processed by the application and to provide the converted response to the application.

10. The electronic device of claim 1, wherein the memory stores instructions which when executed, cause the processor to load a library corresponding to a processing function from an engine for processing the at least one image and to process the at least one image based on the loaded library.

11. The electronic device of claim 1, wherein the memory stores instructions which when executed, cause the processor to stitch the at least one image into one image and to provide the stitched image to the application.

12. A method of controlling an electronic device, the method comprising:
executing a virtual server when a connection of a camera to the electronic device is detected;
identifying an application using at least one image from the camera or identifying an execution of the application in an external electronic device;
receiving at least one image from the camera and processing the at least one image through the virtual server; and
providing the at least one image processed through the virtual server to the application.

13. The method of claim 12, wherein the virtual server is configured to correspond to at least one of identification information of the camera, the application, and types of at least one image from the camera.

14. The method of claim 12, further comprising allocating an Internet protocol (IP) address and a port number to the virtual server.

15. The method of claim 14, further comprising providing a request from the application to the virtual server based on the IP address and the port number of the virtual server.

16. The method of claim 15, wherein providing the at least one image processed through the virtual server to the application comprises providing the at least one image processed through the virtual server to the application in response to the request from the application.

17. The method of claim 16, wherein the request and the response are performed based on a hypertext transfer protocol (HTTP) client-server type.

18. The method of claim 15, wherein providing the request from the application to the virtual server based on the IP address and the port number of the virtual server comprises:
 providing the request to the virtual server through a higher application programming interface (API) between the virtual server and the application; and
 providing the request to the camera through a lower API between the virtual server and a lower level of the virtual server.

19. The method of claim 16, wherein providing the at least one image processed through the virtual server to the application comprises:
 receiving the at least one image from the camera through a lower API between the virtual server and a lower level of the virtual server; and
 providing the at least one processed image to the application as the response based on a higher API between the virtual server and the application.

20. A camera for storing instructions, the camera comprising:
 a plurality of photographing devices, each of which acquires at least one image;
 a memory; and
 a processor,
 wherein the memory stores instructions which when executed, cause the processor to detect a connection of the camera to an external electronic device, detect an execution of an application for processing the at least one image in the external electronic device, load a virtual server corresponding to the application in the memory, control processing of the at least one image through the virtual server, and provide the at least one image processed through the virtual server to the application of the external electronic device.

* * * * *